(12) United States Patent
Aichroth et al.

(10) Patent No.: US 8,978,118 B2
(45) Date of Patent: Mar. 10, 2015

(54) PSEUDONYMIZED AUTHENTICATION

(75) Inventors: Patrick Aichroth, Ilmenau (DE); Sebastian Mann, Erfurt (DE); Michael Gruschwitz, Erfurt (DE); Jens Hasselbach, Erfurt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/344,648

(22) Filed: Jan. 6, 2012

(65) Prior Publication Data

US 2012/0167189 A1    Jun. 28, 2012

Related U.S. Application Data

(63) Continuation of application No. PCT/EP2010/059755, filed on Jul. 7, 2010.

(30) Foreign Application Priority Data

Jul. 7, 2009  (DE) .......................... 10 2009 032 043

(51) Int. Cl.
*H04L 9/32* (2006.01)
*H04L 9/00* (2006.01)
*H04L 29/06* (2006.01)

(52) U.S. Cl.
CPC .............. *H04L 9/3213* (2013.01); *H04L 9/006* (2013.01); *H04L 9/3218* (2013.01); *H04L 63/0807* (2013.01); *H04L 63/0407* (2013.01); *H04L 2209/42* (2013.01); *H04L 2209/50* (2013.01); *H04L 2209/56* (2013.01); *H04L 2209/603* (2013.01)

USPC ............ 726/7; 726/2; 726/5; 726/26; 726/27; 705/1.1; 705/2; 705/3; 709/217

(58) Field of Classification Search
None
See application file for complete search history.

(56) References Cited

U.S. PATENT DOCUMENTS

| 4,987,593 | A  | * | 1/1991  | Chaum .......................... 705/69 |
| 5,732,137 | A  | * | 3/1998  | Aziz ............................. 713/155 |
| 7,043,760 | B2 | * | 5/2006  | Holtzman et al. .............. 726/28 |
| 8,281,149 | B2 | * | 10/2012 | Laurie et al. ................. 713/185 |
| 2006/0031301 | A1 | * | 2/2006  | Herz et al. .................... 709/206 |
| 2009/0031407 | A1 | * | 1/2009  | Kuang ............................. 726/7 |
| 2010/0235284 | A1 | * | 9/2010  | Moore ............................ 705/75 |

OTHER PUBLICATIONS

M. Naor, "Efficient Oblivious Transfer Protocols," Proceedings of the 12th Annual ACM-SIAM Symposium of Discrete Algorithms, Bd. 12, 2001, pp. 448-457.*
Official Communication issued in International Patent Application No. PCT/EP2010/059755, mailed on Mar. 28, 2011.
B. Kang et al., "A Model for Privacy Preserving Metering Service," Second International Conference on Electrical Engineering, IEEE 2008, Mar. 25, 2008, Piscataway, NJ, pp. 1-2.

(Continued)

*Primary Examiner* — Saleh Najjar
*Assistant Examiner* — Jason Plotkin
(74) *Attorney, Agent, or Firm* — Keating & Bennett, LLP

(57) ABSTRACT

An OT or Oblivious Transfer protocol is used to output pseudonym tokens from a list of pseudonym tokens to user entities such that it is possible to obtain pseudonymized authentication by a preceding verification of proof of identity of the respective user entities and marking pseudonym tokens as used as soon as the same are used for authentication by means of the OT protocol after the output.

19 Claims, 17 Drawing Sheets

(56) References Cited

OTHER PUBLICATIONS

L. Chen, "Access with Pseudonyms," International Conference on Cryptography: Policy and Algorithms, Jul. 3, 1995, pp. 232-243.

D. Molnar et al., "A Scalable, Delegatable Pseudonym Protocol Enabling Ownership Transfer of RFID Tags," Selected Areas in Cryptography Lecture Notes in Computer Science, Jan. 1, 2006, Berlin, pp. 276-290.

G. Lowe, "An Attack on the Needham-Schroeder Public-Key Authentication Protocol," Information Processing Letters, Bd. 56, Aug. 22, 1995, pp. 1-5.

M. Burrows et al., "A Logic of Authentication," Proceedings of the Royal Society of London, Bd. 426, 1989, 52 pages.

M. Bellare et al., "Non-Interactive Oblivious Transfer and Applications," Proc. Adv. in Cryptology—CRYPTO '89, Bd. 435, 1990, pp. 547-557.

M. Bellare et al., "Random Oracles are Practical: A Paradigm for Designing Efficient Protocols," Proceedings of the First ACM Conference on Computer and Communications Security, ACM, Nov. 1993, pp. 62-73.

R. Canetti et al., "The Random Oracle Methodology, Revisited," Proceedings of the 30th ACM Symposium on Theory of Computing, Aug. 6, 2002, pp. 1-36.

T. Elgamal, "A Public Key Cryptosystem and a Signature Scheme Based on Discrete Logarithms," IEEE Transactions on Information Theory, vol. IT-31, No. 4, Jul. 1985, pp. 469-472.

A. Fiat et al., "How to Prove Yourself: Practical Solutions to Identification and Signature Problems," CRYPTO '86, Bd. 263, 1986, pp. 186-194.

R. Housley et al., "Internet X.509 Public Key Infrastructure Certificate and CRL Profile," 1999, 130 pages.

C. I'Anson et al., "Security Defects in CCITT Recommendation X.509—The Directory Authentication Framework," Computer Communications Review, Bd. 20, No. 2, 1990, pp. 30-34.

A. Lysyanskaya, "Authentication without Identification," IEEE Security and Privacy, Bd. 5-3, 2007, pp. 69-71.

R. Needham et al., "Using Encryption for Authentication in Large Networks of Computers," Communications of the ACM, Bd. 21, No. 12, Dec. 1978, pp. 993-999.

K. Ohta et al., "A Modification of the Fiat-Shamir Scheme," Advances in Cryptology—CRYPTO '88, LNCS 403, 1990, pp. 232-243.

R.L. Rivest et al., "A Method for Obtaining Digital Signatures and Public-Key Cryptosystems," Communications of the ACM, Bd. 21, No. 2, Feb. 1978, pp. 120-126.

V. Shoup, "Lower Bounds for Discrete Logarithms and Related Problems," Proc. Eurocrypt '97, LNCS, Bd. 1233, 1997, pp. 256-266.

http://www.packtpub.com/article/public-key-infrastructure-pki-otherconcepts-cryptography-cissp.

\* cited by examiner

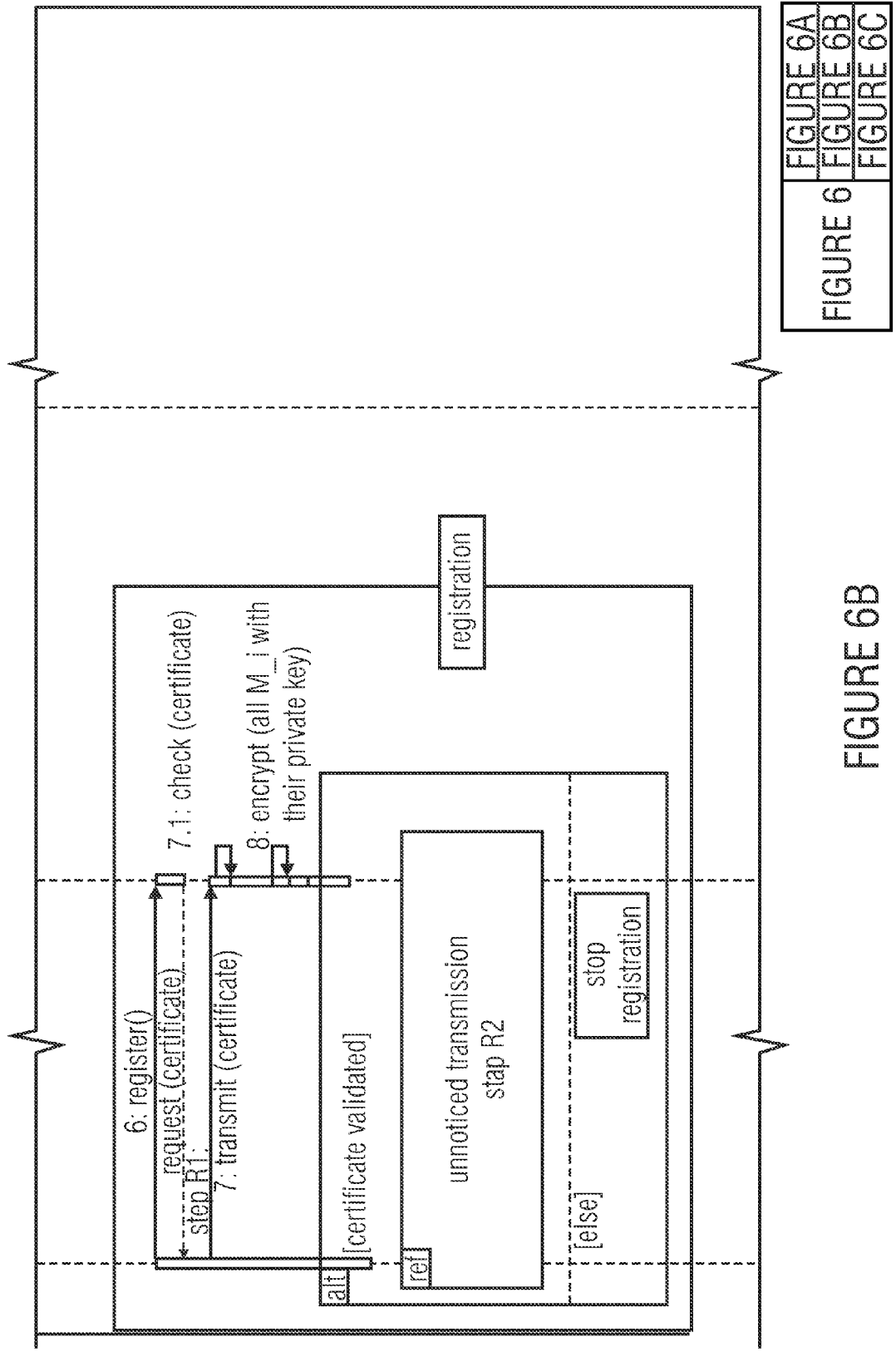

PSEUDONYMIZED AUTHENTICATION

CROSS-REFERENCE TO RELATED APPLICATIONS

This application is a continuation of copending International Application No. PCT/EP2010/059755, filed Jul. 7, 2010, which is incorporated herein by reference in its entirety, and additionally claims priority from German Application No. 102009032043.1, filed Jul. 7, 2009, which is incorporated herein by reference in its entirety.

BACKGROUND OF THE INVENTION

The present invention relates to a possibility of pseudonymized authentication of a user entity.

In many areas of application, authentication of users is necessitated for controlling access to services and resources and for verifying, if necessitated, the authenticity of information provided by the users. Here, typically, frequently methods for "authentication by identification" are used. The same verify, after completed registration (where the real identity is verified more or less thoroughly and concatenated to a log-on name), the identity of the user via log-on. The same allow, via the usage of cryptographic standard methods, in particular digital signatures, also an authentication of information.

However, it is a central problem of these methods that generally the log-on and usage data allow repeated conclusions to the real identity of the users. As spectacular cases of the recent past have shown again and again, this case can occur not only on purpose, but also by stealing information. Since the amount and importance of log-on, user and usage data continue to increase and collection of information covers more and more sensitive areas, the cases of unauthorized usage and criminal stealing of such information are increasing. Thus, increasingly, technical methods are in demand that allow a verifiable protection of this sensitive information, i.e. methods that do not allow conclusions to the real identities, even in the case of a situation of interest for the other protagonists in the respective systems that is disadvantageous for the user.

Such methods for anonymization already exist in many different forms and variations, e.g. in the form of so-called methods for "authentication without identification" (cf. Lysyanskaya, [Lys07]). However, the same have a decisive disadvantage: they prevent not only conclusions to the real identity, but also to the differentiation of users. The same is, however, indispensable for many cases of application, among others for data mining, collaborative filtering, voting methods and many other applications.

A differentiation and authentication of users and the data generated by them with simultaneous protection of privacy would be desirable, even when other protagonists have an interest in misusing user data. This would be of particular interest for two areas of application: on the one hand for such areas of application where, due to the above-described problems, the ability to authenticate (i.e. the reliability) of information is given up in favor of data protection, for example in data mining, where context information is differentiated only indirectly between users. In these cases, by an option for pseudonymous identification, the reliability of the data could be improved (and also data protection, since privacy is frequently only insufficiently protected). On the other hand, for areas of application where data protection in the above-stated sense is abandoned or has to be abandoned due to the above-described problems, since authentication is absolutely essential. In these cases, by means of pseudonymous identification, the requirements could be obtained, while data protection is granted simultaneously and verifiably. This can be useful for increasing the desirability of applications for users, or can simply be necessitated for meeting legal requirements.

Thus, in the above sense, the following three aims are desirable:
1. Authentication of users (and, if needed, the data generated by them),
2. Possibility of reliably differentiating between user (and, if needed, the data generated by them), for example for personalization purposes, data mining, voting, allocation of users to groups, target-oriented authorization of the access to services and resources, etc.
3. Protection of privacy (also when assuming that data can "go missing" with system protagonists intentionally or unintentionally and can hence be combined and misused by an interested party) in the sense of preventing conclusions to the real identity of a user.

With current methods, these aims cannot be reached simultaneously:

With common user authentication methods based on "authentication by identification", points (1) and (2) can be fulfilled. However, here there are significant problems or risks in the field of data protection, since the real identities of users can be determined: either directly or—in the case of organizational protection measures— in the very realistic case of data theft by third parties or the sale of data by system protagonists.

On the other hand, methods allowing a completely anonymous user authentication exist (cf. ZK methods) and hence fulfill (1) and (3) which, however, no longer allow a differentiation between users and are therefore not useful for many cases of application.

Finally, for the stated cases of application (e.g. data mining) there are again methods allowing differentiation between users via "auxiliary constructions" and context information (e.g. IP addresses), thereby protecting privacy more or less satisfactorily, i.e. fulfilling (2) and (3)—although frequently only in a limited manner— which, however, do not allow authentication of users and their data and are thus not useful for certain cases of application or only in a limited manner.

In contrast to this, it is the target of the described method to fulfill the stated targets simultaneously. In this way, the following compelling requirements are formulated for further illustration:

a) Authentication: A service can verify during log-on whether the user is the one he is pretending to be (and has provided proof of identification in advance).

b) Privacy protection: No system protagonist except the user, in particular not the service the user logs on to, can draw conclusions to the real identity of the user.

c) Pseudonymization: During log-on, the user can be allocated a unique pseudonym (ID) which can be used for differentiating between users and for authorizing specific actions. It should not be possible for anybody apart from the user (see above) to establish a connection between the real identity and the pseudonym.

Apart from that, it is basically useful when the method addresses the following optional requirements:

d) Reuse of existing standard methods for authentication, e.g. qualified certificates.

e) Reusability of authorization information: A single registration should enable log-on to several different services.

In other words, a method for generating and using unique pseudonyms for authentication purposes would be desirable, which, on the one hand, is bound in a verifiable manner to real identities (of users, devices or software) and, on the other hand, allows no subsequent conclusions to the real identities.

SUMMARY

According to an embodiment, a system for pseudonymized authentication of user entities, implemented to verify a proof of identity of a user entity, output, in the case of successful verification of the proof of identity of the user entity, a pseudonym token of a portion of unused pseudonym tokens from a plurality of pseudonym tokens to the user entity by means of an Oblivious Transfer protocol; perform an authentication process of the user entity with the pseudonym token with the user entity; and in response to the authentication process of the user entity, mark the pseudonym token as used, so that the portion of unused pseudonym tokens is reduced by the pseudonym token, may have: a registration location implemented to perform the verification of the proof of identity and the output of the pseudonym token; and a log-on location implemented to perform the authentication process of the user entity and to mark the pseudonym token as used, namely to verify within the authentication process of the user entity with the predetermined pseudonym token whether the predetermined pseudonym token belongs to the portion of unused pseudonym tokens from the plurality of pseudonym tokens, and if the result of the verification is that the predetermined pseudonym token does not belong to the portion of unused pseudonym tokens, not to complete the authentication process and, if the result of the verification is that the predetermined pseudonym token belongs to the portion of unused pseudonym tokens, to complete the authentication process and mark the pseudonym token as used, so that the portion of unused pseudonym tokens is reduced by the pseudonym token, wherein the registration location is implemented to output, during a next output of a pseudonym token, the same from the reduced portion of unused pseudonym tokens from the plurality of pseudonym tokens by means of the Oblivious Transfer protocol.

Another embodiment may have a registration location for outputting a pseudonym token for a user entity, implemented to verify a proof of identity of the user entity, and output, in the case of successful verification of the proof of identity of the user entity, a pseudonym token of a portion of unused pseudonym tokens from a plurality of pseudonym tokens to the user entity by means of an Oblivious Transfer protocol and, when the pseudonym token is marked as used by a log-on location, so that the portion of unused pseudonym tokens is reduced by the pseudonym token, to output, during a next output of a pseudonym token, the same from the reduced portion of unused pseudonym tokens from the plurality of pseudonym tokens by means of the Oblivious Transfer protocol.

Another embodiment may have a log-on location, implemented to either generate a plurality of pseudonym tokens suitable for an Oblivious Transfer protocol and pass them on to a registration location or request and receive the same from the registration location, verify within an authentication process of a user entity with a predetermined pseudonym token whether the predetermined pseudonym token belongs to a portion of unused pseudonym tokens from the plurality of pseudonym tokens, and if the result of the verification is that the predetermined pseudonym token does not belong to the portion of unused pseudonym tokens, not to complete the authentication process and, if the result of the verification is that the predetermined pseudonym token belongs to the portion of unused pseudonym tokens, to complete the authentication process and mark the pseudonym token as used, so that a portion of unused pseudonym tokens from the plurality of pseudonym tokens is reduced.

According to another embodiment, a method for pseudonymized authentication of user entities may have the steps of: verifying a proof of identity of a user entity, outputting, in the case of a successful verification of the proof of identity of the user entity, a pseudonym token of a portion of unused pseudonym tokens from a plurality of pseudonym tokens to the user entity by means of an Oblivious Transfer protocol; performing an authentication process of the user entity with the pseudonym token with the user entity; and in response to the authentication process of the user entity with the pseudonym token, marking the pseudonym token as used, so that the portion of unused pseudonym tokens is reduced by the pseudonym token, wherein the verification of the proof of identity and the output of the pseudonym token are performed in a registration location; and wherein the authentication process of the user entity with the user entity and marking the pseudonym token as used, so that the portion of unused pseudonym tokens is reduced by the pseudonym token, are performed in a log-on location, wherein it is verified within the authentication process of the user entity with the predetermined pseudonym token whether the predetermined pseudonym token belongs to the portion of unused pseudonym tokens from the plurality of pseudonym tokens, and wherein, if the result of the verification is that the predetermined pseudonym token does not belong to the portion of unused pseudonym tokens, the authentication process is not completed and, if the result of the verification is that the predetermined pseudonym token belongs to the portion of unused pseudonym tokens, the authentication process is completed and the pseudonym token is marked as used, wherein during a next output of a pseudonym token in the registration location, the same is output from the reduced portion of unused pseudonym tokens from the plurality of pseudonym tokens by means of the Oblivious Transfer protocol.

According to another embodiment, a method for outputting a pseudonym token for a user entity may have the steps of: verifying a proof of identity of the user entity, and outputting, in the case of a successful verification of the proof of identity of the user entity, a pseudonym token of a portion of unused pseudonym tokens from a plurality of pseudonym tokens to the user entity by means of an Oblivious Transfer Protocol and, when the pseudonym token is marked as used by a log-on location, so that the portion of unused pseudonym tokens is reduced by the pseudonym token, outputting, during a next output of a pseudonym token, the same from the reduced portion of unused pseudonym tokens from the plurality of pseudonym tokens by means of the Oblivious Transfer protocol.

According to another embodiment, an authentication method may have the steps of: generating a plurality of pseudonym tokens suitable for an Oblivious Transfer protocol and passing them on to a registration location or requesting a plurality of pseudonym tokens suitable for an Oblivious Transfer protocol from the registration location and receiving the same from the registration location, verifying, within an authentication process of a user entity with a predetermined pseudonym token whether the predetermined pseudonym token belongs to a portion of unused pseudonym tokens from the plurality of pseudonym tokens, and if the result of the verification is that the predetermined pseudonym token does not belong to the portion of unused pseudonym tokens, not completing the authentication process and, if the result of the verification is that the predetermined pseudonym token belongs to the portion of unused pseudonym tokens, completing the authentication process and marking the pseudonym token as used, so that a portion of unused pseudonym tokens from the plurality of pseudonym tokens is reduced.

Another embodiment may have a computer program having a program code for performing the inventive methods when the program runs on a computer.

It is a central idea of the present invention that an OT, or oblivious transfer protocol, can be used to output a pseudonym token from a list of pseudonym tokens to user entities, such as persons, devices or software products, so that it becomes possible to achieve the above targets by advance identification of the respective user entities and by marking pseudonym tokens as used as soon as they are used for authentication after being output by means of the OT protocol.

BRIEF DESCRIPTION OF THE DRAWINGS

Embodiments of the present invention will be detailed subsequently referring to the appended drawings, in which.

DETAILED DESCRIPTION OF THE INVENTION

System Overview and Protagonists

Figure 1:
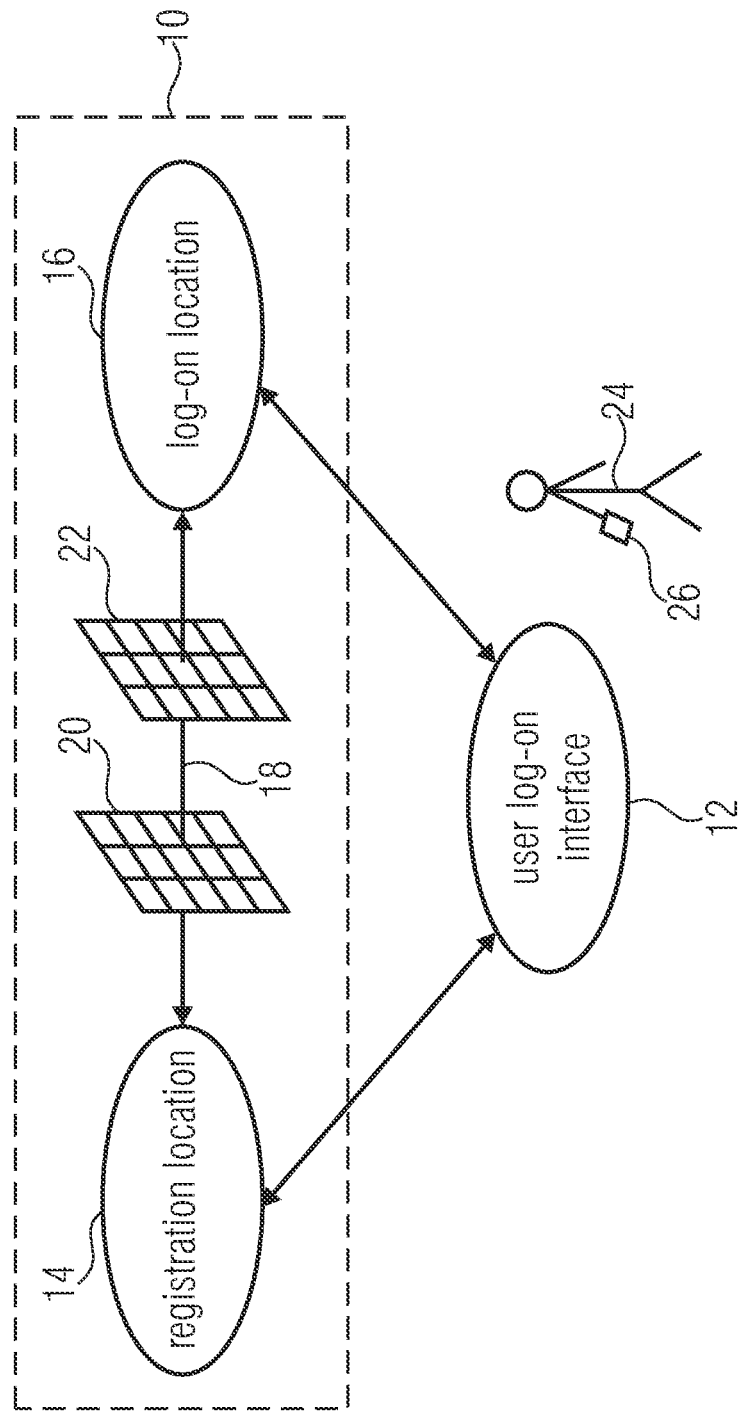
FIG. 1 is a block diagram of a scenario with a system for a pseudonymized log-on of users and a user log-on interface according to an embodiment.

FIG. 1 shows a scenario or an environment for the pseudonymized log-on of users according to an embodiment of the present application. The system is generally indicated by reference number 10. The system 10 is intended for users to be able to log on in a pseudonymized manner to the same, i.e. while maintaining their privacy or true identity, but simultaneously maintaining user authentication and maintaining the option of reliable user differentiation. Users use a user interface 12 for authentication or log-on to the system 10. For reasons of clarity, only one user interface 12 is illustrated in FIG. 1.

The system 10 comprises, for example, one or several computers, such as a computer network as well as a respective program implementing the functionality of the system 10, which will be discussed in more detail below. In particular, the functionalities and tasks of the system 10 can be divided between two entities, as will also be discussed in more detail below, namely a registration location 14 and a log-on location 16. The latter can again each comprise one or several computers or a computer network, on which a respective program runs, which takes on the respective part of the functionalities of the system 10. Registration location 14 and log-on location 16 are communicatively connected to one another via a communication interface 18. Due to the different tasks of the registration location 14 and the log-on location 16 to be discussed in more detail below and the possibly existing "trust boundaries" between the same, a more or less strong organizational and also technical separation or decoupling between the registration location 14 and the log-on location 16 can exist, which can manifest itself, for example, in the form of one or several firewalls 20 or 22, wherein the firewall 20 can, for example, be the firewall of the registration location 14 and the firewall 22 the firewall of the log-on location 16. Also, the user log-on interface 12 can be a computer or a computer network on which a respective program runs with respective functionalities. The user log-on location 12 can be communicatively connected to the system 10 or the registration location 14 and the log-on location 16, and again exemplarily via one or several firewalls, which are, however, not illustrated in FIG. 1 for reasons of clarity.

In particular, the user log-on interface 12 is, for example, the personal computer of the user in the case that the user is a person, as is indicated in FIG. 1. Generally, the embodiment of FIG. 1 as well as the following embodiments can also be transferred to other user entities, such as devices or software products, in which case the user log-on interface 12 can also be a processor of the user entity. For reasons of simplicity, however, in the following, the case of a person as a user entity is frequently assumed exemplarily but, as has been mentioned, alternatives to this can easily be derived from the following description and will sometimes also be explicitly stated below.

As has already been mentioned, the system 10 is implemented such that a user can log on to the same in a pseudonymized manner. This means that, on the one hand, proof of identification of the users has to be provided, or the users who want to be logged on to the system 10 are to be uniquely identified, but that, on the other hand, it should be possible for a user who has provided such a successful proof of identity to log on to the system 10 with a pseudonym so that the same can be reliably differentiated from other users and his privacy is protected, namely in that no unauthorized third party is able to draw conclusions to properties of the user from traces that the user leaves on the system 10 under the pseudonym, or to associate these activities with the specific user.

For this purpose, the system is implemented to uniquely identify the user, to output to the user, in the case of successful proof of identification of the user, a pseudonym of a portion of unused pseudonym tokens from a plurality of pseudonym tokens by means of an OT protocol, to perform a log-on process of the user with the pseudonym token output to him, and to mark the pseudonym token as used in response to the log-on process of the user with the pseudonym token such that the portion of unused pseudonym tokens is reduced by the pseudonym token.

For providing proof of the identification of the user, illustrated exemplarily in FIG. 1 as a person by reference number 24, different options exist. Proof of identification can be provided automatically, semi-automatically or purely personally. This means that the user 24 can, for example, present himself personally at the user log-on interface 12. For example, the user 24 can identify himself via the user log-on interface 12 to the system 10 by a passport or an electric circuit 26. Proof of identification of the user 24 can hence be provided in particular also indirectly, such that an entity uniquely associated to the user 24 is verified by the system 10. For example, an electronic passport 26, or a secret private key, or the same can be uniquely associated to the user 24. Mixtures of the above-mentioned options are also possible, for example issuing the above-mentioned uniquely associated entity to the user in response to providing personal proof of identification of the user 24 with subsequent proof of identification of the user 24 indirectly via his uniquely associated entity issued in this way, such as the electronic passport 26. In the following, further embodiments will be provided.

The system 10 can be implemented to terminate communication with the user 24 in the case of failed identification of the user 24 or at least not to carry out the steps described below for issuing a pseudonym to the user 24, so that the user 24 does not obtain a pseudonym. Failure of identification can have different reasons. The reasons can be of a technical nature, i.e. the electronic passport has expired or the like. It can also be possible that the registration location 14 can only uniquely identify a predetermined group of users or can only perform a verification of proof of identity for the same. For example, the registration location 14 allows only a unique identification or proof of identity of adults, so that a user 24 who is not yet grown up cannot successfully complete identification at the system 10.

However, as is described above, the system 10 is implemented to output, in the case of successful unique identification of the user, a pseudonym token of a portion of unused pseudonym tokens from a plurality of pseudonym tokens to the user 24 by means of an OT protocol. In other words, the system 10 owns a plurality of pseudonym tokens, i.e. a pseudonym token list which is, for example, stored in a memory (not shown) of the system 10. As will be discussed below, pseudonym tokens, sometimes referred to below only as tokens, can be signed. The pseudonym tokens can also exist in a form not only suitable for the OT protocol, but also for the Zero-Knowledge Protocol optionally performed subsequently, which will be further explained below. In the pseudonym token list, several pseudonym tokens can already be marked as used. In this case, the OT protocol will only be performed with respect to the portion of unused pseudonym tokens from the pseudonym token list. Thus, this portion is a sub-set of the whole plurality of pseudonym tokens. As is characteristic for the OT protocol, the system 10 receives no knowledge about which pseudonym token the user log-on interface 12 or the user 24 obtains from the portion of unused pseudonym tokens. Details regarding this will be described below in more detail.

The system 10 is further implemented to perform an authentication process of the user 24. For this authentication process, the user 24 should use a pseudonym token that had been output to him from the system 10 by means of the OT protocol. The system 10 is implemented to verify, when performing the authentication process, whether the pseudonym token by which the user 24 logs on, belongs to the pseudonym token list, and here to the unmarked part of the same. If the pseudonym token presented by the user 24 during the log-on process does not belong to the pseudonym list or is already marked as used, the system 10 terminates the authentication process. In the case that it is determined that the user 24 logs on with an unused pseudonym token belonging to the pseudonym token list during the authentication process, the system 10 successfully completes the authentication process and marks the pseudonym token presented by the user 24 as used, so that the portion of unused pseudonym tokens for future pseudonym token outputs is reduced by the respective pseudonym token.

Various deviations from the above description can be performed, and many of those will be explicitly mentioned below. For example, the user 24 can receive more than one pseudonym token from the system 10. The communication between system 10 and user log-on interface 12 or user 24 can be encrypted in order to be tap-proof against unauthorized third parties. In addition to that, the usage of anonymization services, networks and tools (e.g. TOR, JAP, respective browser plug-ins) can be useful. The same are not to be mixed up with the usage of anonymization methods for authentication without identification, but this is an exclusive case of avoiding unintentionally leaving possible "traces" during communication between protagonists that might possibly allow—completely independent from the authentication method!—indirect conclusions to the real identity. This applies in particular to the communication between log-on location and user log-on interface 12 or the user 24. In particular, the communication between user log-on interface 12 and log-on location 16 can run via a proxy server or anonymization services.

As has been described above, due to the usage of the OT protocol, the system 10 does not know which pseudonym token has been issued to the user 24 during the OT protocol. When the user 24 then logs on to the system 10 during the authentication process and hence communicates to the system 10 its issued pseudonym token, the degree of anonymization naturally depends on how many pseudonym tokens the system 10 has output to other users in the interval between output of the pseudonym token and log-on of the user 24 with the pseudonym token. For controlling this temporal offset, different mechanisms can be provided, such as communicating to the user 24 when issuing the pseudonym token that he has to wait with logging on to the system 10 using this pseudonym token for a predetermined minimum period, which depends on the expected average pseudonym token output rate. Another option would be that the system 10 delays or bundles the last output according to the OT protocol with which users 24 obtain their pseudonym token, from which the system 10 does not know which one it is, for a predetermined minimum number of users or over a predetermined minimum time period which can correspond to that mentioned above, and then performs this last output according to the OT protocol for the stated users all at once, so that following log-on or authentication processes with this pseudonym token can no longer be associated to the identification processes that have led to the output pseudonym token.

Another option for interrupting the allocation option between OT protocol-based output and logging the usage of pseudonym tokens in log-ons after the pseudonym token output is dividing the system 10 into the two entities, namely the registration location 14 on the one hand and the log-on location 16 on the other hand, as will be described below based on embodiments. Here, in particular, the registration location 14 can take on the task of verifying proof of identity occurring, for example, once per user entity, and the log-on location 16 the task of authentication or log-on for a certain service occurring, for example, several times per user entity, which service then allows access to resources and functionalities based on this authentication or log-on. In practice, the log-on location 16 can thereby by closely connected to the respective services or even completely integrated into their systems. With regard to efficient division of labor (a comparatively complex verification of proof of identity versus a comparatively less complex subsequent log-on or authentication), many log-on locations 16 can exist for one registration location 14, as will be described in more detail below. Between registration location 14 and log-on location 16, a so-called "trust boundary" can exist—a term from security analysis for delimiting system or system parts characterized by different degrees of trust: the user mandatorily has to provide the registration location 14 with data for verifying proof of identity, but simultaneously he has a very strong interest that the log-on location 16 does exactly not receive these data or cannot link them to the user entity. As an indication of the existence of "trust boundaries", firewalls can exist, as is indicated in FIG. 1, but boundaries can also exist without firewalls. The firewalls shown in FIG. 1 are a symbol of areas of different degrees of trust (in particular from the point of view of the user entity) frequently connected with a more or less strong organizational and technical decoupling of areas.

So far, it has not been explicitly stated what is meant by "pseudonym tokens". These tokens can be numbers or symbol/bit sequences that have been selected either randomly or deterministically from a predetermined set of definitions, which is again limited by certain secondary conditions, such as, to begin with, the condition that the tokens have to be suitable for the OT protocol and, optionally, that the same are suitable for the Zero-Knowledge method, which might possibly be used for the user 24 to prove to the system 10 during log-on that he owns a token output by the system 10.

In the following, the embodiment will be discussed where the system 10 is divided into registration location 14 on the one hand and log-on location 16 on the other hand. In this case, three protagonists exist in the scenario of FIG. 1, namely the registration location 14 which can act as central registration instance, the log-on location 16 which can act as subsequent log-on or registration location, and finally the user log-on interface 12 of the user or end user 24. The central registration instance is responsible for the above-mentioned verification of identity, such as via passport 26, biometric features, a qualified certificate, etc., wherein in the latter case the identity, as has been mentioned, is not proved directly but indirectly. The subsequent log-on or registration location 16 performs registration and log-on or authentication of the users 24 for specific application purposes, such as a specific service offered to users. In such a scenario, several log-on locations 16 can belong to or cooperate with the registration location 14, and again several users can belong to or cooperate with the log-on location 16.

The division of the system 10 into registration location 14 and the log-on location 16 has different advantages. To begin with, the tasks for which the registration location 14 is responsible, which will be discussed in more detail below, are much more complex than the tasks for which the log-on location 16 is responsible, which is why it is advantageous when the registration location 14 can be used by several log-on locations 16. In addition, the distribution of the tasks of the system 10 to the registration location 14 and the log-on location 16 has the effect that the registration location 14 should be more reliable than the log-on location 16, namely at least in that it should be ensured that the registration location 14 employs its tasks as intended and, for example, does not manipulate tokens or only pretends to perform an OT protocol but does not do so. Ensuring a respective verification of the correct execution of tasks is much more realistic at a central location than at many individual providers. By organizationally separating the registration location 14 from the log-on location 16, it can also be technically ensured at the log-on location 16 that no "inadmissible communication paths" to the registration location 14 exist, such as by respective isolation and possibly state control etc. The firewall 20 is part of such a possible measure. Organizational separation also corresponds to practical customs, since the division into more complex processes for the registration location 14 and less complex processes for the log-on location 16 corresponds, for example, to the separation into "hard" or "complex" proofs of identification at post office branches compared to "simple registrations" by email or the like. The division is hence more integration-friendly in many applications.

Figure 2:
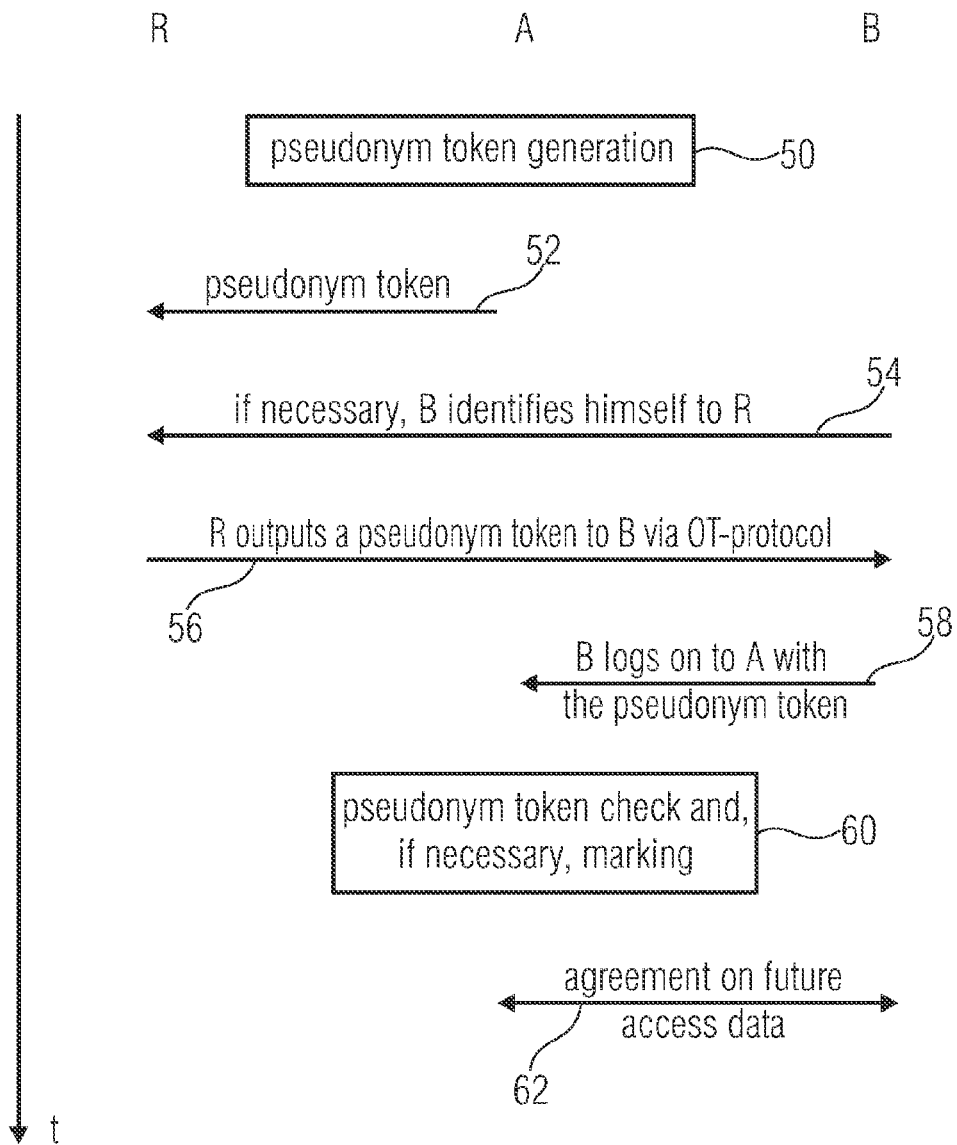
FIG. 2 is a schematic flow protocol where the scenario in FIG. 1 is performed according to an embodiment.

In the following, with reference to FIG. 2, a flow of a pseudonymized log-on within the scenario of FIG. 1 will be described according to an embodiment for the case that the system 10 is divided into registration location 14 on the one hand and log-on location 16 on the other hand. In FIG. 2, measures taken at the registration location R, the log-on location A or the user log-on interface or the user/end user B are, represented in blocks, depending on where they are taken, on the left for the registration location R, in the centre for the log-on location A and on the right for the user B. Arrows indicate a communication between two parties of the three parties 12, 14 and 16 and point, according to the communication direction, from the respective transmitter to the respective receiver. The chronology of the communications and actions is shown in chronological order from top to bottom. In other words, the time axis t runs from top to bottom.

The pseudonymized authentication according to FIG. 2 starts with pseudonym token generation 50 in the log-on location 16. As has already been mentioned, pseudonym token generation 50 is performed such that the pseudonym token list fulfils certain criteria, which are imposed by the OT protocol and possibly, optionally, by further protocols such as the Zero-Knowledge Protocol.

The log-on location 16 informs the registration location 14 about the pseudonym tokens or outputs the plurality of pseudonym tokens in a communication 52 to the registration location 14 or makes the same accessible for the same. Communication 52 takes place via the communication channel 18. It can happen that the registration location 14 modifies the plurality of pseudonym tokens from the log-on location 16, which will be discussed in more detail in the following detailed embodiments. It can be the case, for example, that the registration location 14 prepares the pseudonym tokens for a Zero-Knowledge method by using a modular multiplication with a random number.

At any point of time after the preparatory measures 50 and 52, the user 24 identifies himself at the registration location 14, i.e. the registration location 14 performs the above-mentioned unique identification of the user 24, which is illustrated in FIG. 2 by a communication 54 from the user 24 to the registration location 14. In the case that the identification 54 is successful, the registration location 14 gives out a pseudonym token to the user 24 via communication 56 by means of the OT protocol, wherein the output 56 is illustrated by a simple arrow from R to B although the OT protocol necessitates several to-and-fro communications between R and B.

If the identification 54 from B at R has not been successful, the registration location 14 will provide for the OT protocol not being started at all or not resulting in the output of a pseudonym token to the user 24.

At any time after the user 24 has received the pseudonym token per OT protocol from the registration location 14, the user 24 logs on to the registration location 16 with the pseudonym token, which is illustrated by the communication arrow 58. The log-on location 16 verifies whether the pseudonym token provided by the user 24 in the communication 58 belongs to the pseudonym tokens generated in step 50 and further verifies whether the pseudonym token is still unused, and marks, if the verification of both criteria is positive, the pseudonym token as used, which is indicated in FIG. 2 by reference number 60. Only in the case of the positive verification that the pseudonym token of the user B belongs to the unused portion of pseudonym tokens from the pseudonym token generation 50, the log-on location and the user 24 or the user log-on interface 12 agree, in a subsequent communication 62, on future access data for possible future log-ons of the user 24 to the log-on location 16. These access data can comprise, for example, a user name and an allocated password for the user 24, wherein the user 24 should obviously be careful when selecting the user name, so that the selected user name does not allow conclusions to his actual person. If he is careful enough, the described method according to FIG. 2 has the effect that the user 24 can in future log on anonymously to the log-on location 16, wherein, vice versa, the log-on location 16 can be sure that the users logged on in this manner are different persons identified by the registration location 14 who comply with criteria regarding age, etc., the fulfillment of which has been verified by the registration location 14. In addition to that, a separation of the knowledge about the times when the pseudonym tokens were issued to users and the times when the pseudonym tokens were used for logging on to the log-on location within communications 58 takes place, since the former times are only known to the registration location 14 and the latter times only to the log-on location 16. In this way, neither the registration location 14 nor the log-on location 16 can make speculations as to which pseudonym tokens could be allocated to which user identity and with what probability.

Figure 3:
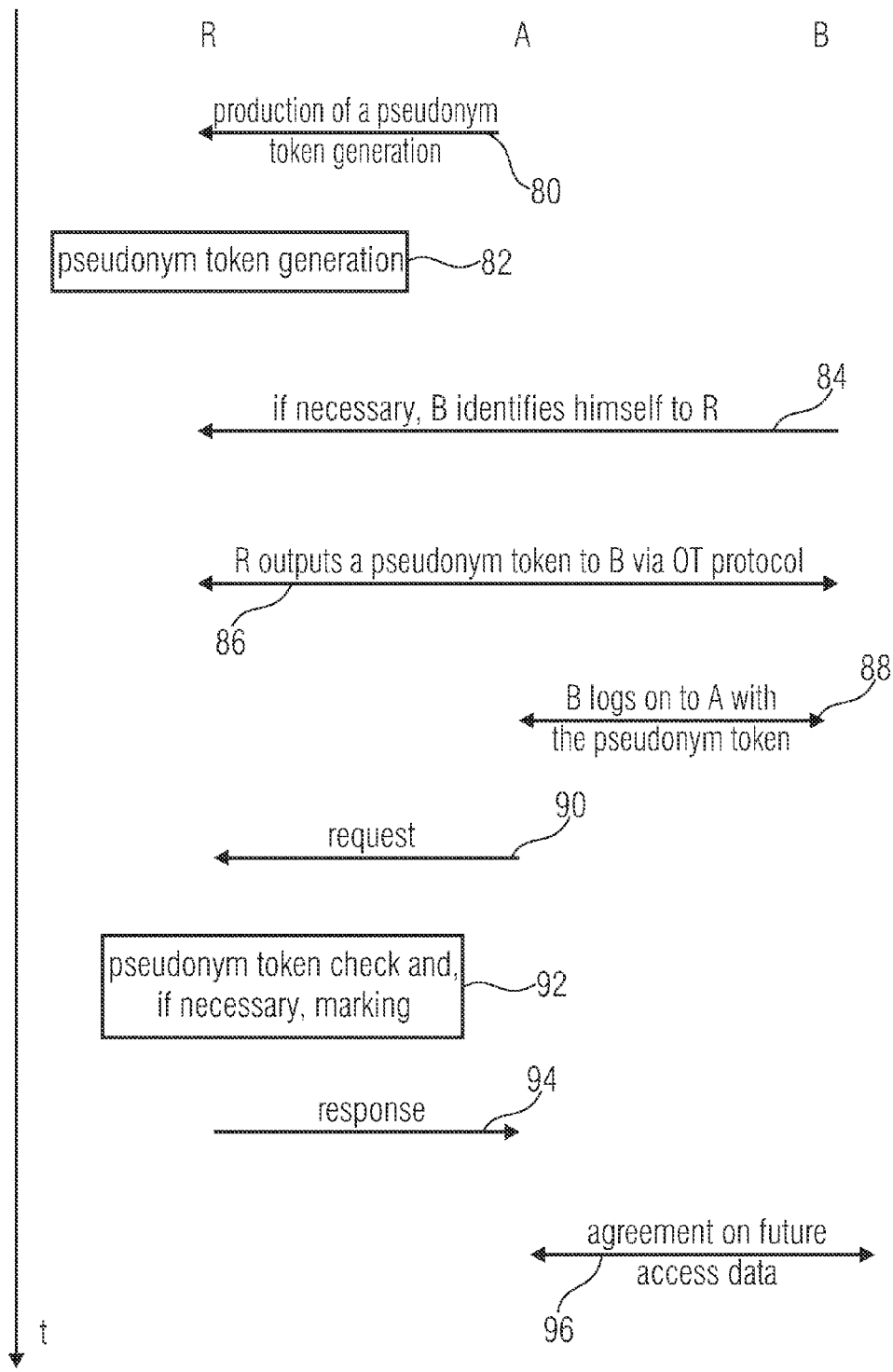
FIG. 3 is a further flow protocol where the scenario of FIG. 1 is performed according to an embodiment.

FIG. 3 shows an alternative course of a pseudonymized authentication in the scenario of FIG. 1. According to FIG. 3, the method begins with a request 80 from the log-on location 16 to the registration location 14 to perform pseudonym token generation, which again performs this pseudonym token generation 82 in response. The pseudonym token generation 82 can correspond to the pseudonym token generation 50 of FIG. 2.

At an appropriate time after the pseudonym token generation 82, the user 24 identifies himself to the registration location 14 or the registration location 14 identifies the user 24, which is indicated in FIG. 3 by arrow 84. In the case of a positive identification, the registration location 14 outputs a pseudonym token from the pseudonym token generation 82 via OT protocol to the user 24. Thereupon, the user 24 logs on to the log-on location 16 with the pseudonym token at 88. Communications 84-88 correspond to communications 54-58 of FIG. 2. Thereupon, the log-on location 16 queries the registration location 14 within a communication 90 as to whether the pseudonym token from the user 24 is an unused one from the pseudonym generation 82. The registration location 14 subsequently verifies this at 92 to correspondingly mark the pseudonym token as used in the positive case and to output a respective response 94 to the log-on location 16, which thereupon, corresponding to the communication 62 of FIG. 2, agrees on future access data with the user 24 in a communication 96.

Compared to the embodiment of FIG. 2, the procedure according to FIG. 3 has the disadvantage that the registration location 14 could connect the above-mentioned times of the pseudonym token output 86 and the pseudonym token usage 90 for drawing conclusions to the potential identity of the user 24. The detour of the return path of the pseudonym token from the user 24 to the registration location 14 via the log-on location 16 could, however, be used to increase the above-mentioned time decorrelation.

Finally, it should be noted that the above procedures could also be combined. For example, steps 80 and 82 could be performed instead of step 50 of FIG. 2 for performing pseudonym token generation at the registration location 14 upon the request of the log-on location 16, wherein the pseudonym token would then be communicated from the registration location 14 to the log-on location 16 and not vice versa. All other steps of FIG. 2 would remain the same. Further possible modifications can be easily inferred from the following description.

Summarizing the above embodiments, the registration location 14 can be implemented to uniquely identify a user 24 for outputting a pseudonym token for the user 24, or to verify a proof of identity of the same 54; 84 and to output, in the case of successful unique identification of the user 24 or verification of proof of identity, a pseudonym token from a portion of unused pseudonym tokens from a plurality of pseudonym tokens by means of an OT protocol to the user 24. Here, the verification of the proof of identity 54; 84 can comprise performing cryptographic protocols where the user 24 identifies himself to the registration location 14 by means of an electronic circuit 26, such as a SmartCard uniquely allocated to the user 24. The unique authentication 54; 84 can comprise, in particular, looking up in a user database (not shown) in which clearly differentiatable entries to a plurality of authorized users are stored and verifying whether the user 24 belongs to the plurality of authorized users, in which case the unique identification or verification of the proof of identity is successful and otherwise not. The registration location 14 can also be implemented in particular to obtain the plurality of pseudonym tokens from the log-on location 16 via a firewall 20 or 22, wherein the further communication of the registration location 14 can also be implemented via the same. The registration location 14 can also be performed to generate the plurality of pseudonym tokens (82) in response to a request 18 by the log-on location 16 and to send them to the log-on location 16 (52 in the opposite direction). In the case of generating the plurality of pseudonym tokens by the registration location 14, the same can be implemented to provide the plurality of pseudonyms individually with a respective signature of the registration location 14, so that the same can be verified for their correct signature by the log-on location. Further, the registration location 14 can be implemented to submit, in response to a request of the log-on location 16, a predetermined pseudonym included in the request to a verification of authenticity, and to answer the log-on location 16 according to the result of this verification of authenticity. The verification of authenticity can be enabled by generating every token according to a secret known only to the registration location, so that randomly guessing a real token is very unlikely. The latter communication between the log-on location 16 and the registration location 14 can take place, for example, in response to the step 58 as an additional prerequisite for executing the agreement 62 of the future access data.

The log-on location 16 can be implemented either to generate (50) a plurality of pseudonym tokens suitable for the OT protocol and to pass them on (52) to the registration location 14 or to request (80) them from the registration location 14 and to receive them (52 in the opposite direction). The log-on location 16 could further be implemented to verify (60) within an authentication process a user with a predetermined pseudonym token whether the predetermined pseudonym token belongs to a portion of unused pseudonym tokens of the plurality of pseudonym tokens, and, if the result of the verification is that the predetermined pseudonym token does not belong to this portion, to not (successfully) terminate the authentication process and, if the result of the verification is that the predetermined pseudonym token belongs to this portion, to (successfully) complete the authentication process and to mark (60) the pseudonym token as used, so that the portion of unused pseudonym tokens of the plurality of pseudonym tokens is reduced. Here, the log-on location 16 could be implemented to verify by means of a Zero-Knowledge method whether the predetermined pseudonym token belongs to the portion of unused pseudonym tokens. The log-on location 16 could further be implemented to agree with the user on access data for future log-on processes between the user 24 and the log-on location 16 on completion of the process, possibly by using an encrypted channel, wherein it should be noted that, depending on the application, no future log-ons might be necessitated. The plurality of pseudonym tokens could be individually provided with a respective signature of the registration location 14, and the log-on location 16 could be implemented to verify, within the authentication process, the predetermined pseudonym token as to whether the same is provided with the correct signature, and, if this is not the case, to not (successfully) terminate the authentication process. A query at the registration location 14 requesting verification of authenticity would also be possible. The log-on location could also comprise a firewall 22 and could be implemented to pass (52) the plurality of pseudonym tokens onto the registration location 14 via the firewall 22.

The user log-on interface 12 for pseudonymized authentication of the user 24 at the log-on location 16 can be implemented to identify the user 24 at the system 10 or at the registration location 14 and to perform an OT protocol with the system 10 or the registration location 14 to obtain a pseudonym token, as well as to perform an authentication process at the system 10 or at the log-on location, where the pseudonym token is used, wherein the latter process can take place via a proxy server or anonymization services for additionally complicating a tracing option for the log-on location 16.

Thus, the above embodiments are suitable for cases of application for the authentication of users necessitating the existence of unique pseudonyms or tokens, but still preventing tracing of personal identities of the users, unless the user reveals his identity himself by respective actions. Here, it should again be noted that the users 24 do not have to be persons, but users can also be devices or a specific software.

Further, it should be noted that in the above embodiments, where the system 10 is divided into a registration location 14 and a log-on location 16, anonymization is also maintained when data are exchanged between registration instance and log-on location or service provider, even when this should actually not be "allowed" or even when data from the registration instance 14 and the log-on location 16 get into the hands of third parties, such as by data theft. The above embodiments can thus also be implemented in an "integration-friendly" manner, namely in that they leave existing methods for authentication and authorization mainly untouched or allow maximum freedom.

The above embodiments can realize this by:
usage of existing authentication methods for ensuring that users 24 have to pass through a process 54; 84 which is defined and trustworthy for a service provider/a log-on location 16 for proof of legitimacy;
usage 58; 88 of suitable tokens as proof of legitimacy including generation 50; 82 of tokens suitable for the other steps and methods of "locking" 60; 92 tokens without infringing data protection targets;
usage of Oblivious Transfer 56; 86 for transmitting tokens for ensuring decoupling of the "natural" identity from the identities/pseudonyms used later at the respective log-on locations (service providers) 16.

It should be noted that in addition to the described steps during pseudonymized log-on, such as in addition to the steps of FIGS. 2 and 3, further security standard methods can be used for providing transmission security etc., in particular for the purpose of transmission security, such as asymmetric encryptions, symmetrical encryptions, signatures, hashing as well as certificates. In particular, users 24 should avoid tracing their identity by IP address etc. during communication by using respective services/proxies etc.

Additional Remarks

In the following, embodiments of the present invention will be described in more detail, wherein again reference is made to the embodiments of FIGS. 1 to 3. For example, according to a further embodiment, the possible protocol or flow diagram for pseudonymized authentication of users can also be described as follows.

In this first phase of preparation and token generation/transmission, in particular, the following steps can be performed:

log-on location 16 and registration location 14 select (50; 80) the values, which are needed for performing the Oblivious Transfer and the optional Zero-Knowledge Protocol. Depending on the type of usage, these values can be selected randomly (via any type of random generator) or by means of an appropriate algorithm or self-determined rules. The prime numbers necessitated for the protocol will be generated by means of suitable prime number generators.

Further, in this step (50) the (random) tokens can be generated by the log-on location 16—more precisely, the log-on location 16 can generate a pool of tokens transmitted (52) to the registration location 14. The tokens have to be suitable for the OT method (see below), and the pool should be large enough to keep the probability of random multiple provisions of pseudonyms extremely low, such that the log-on location, when perceiving a "wrong" token, can assume that this is the log-on of a malevolent unauthorized person. In the case of the optional usage of Zero Knowledge (ZK) described further below, for the step of log-on with the pseudonym (58) for additionally improving data protection, the definition range for the tokens is additionally limited by the respective ZK method. Diverse ZK methods can be used, such as the Otha-Okamoto Zero-Knowledge Protocol.

Signing the generated token with the private key of the respective log-on location 16 for the purpose of verification of authenticity/integrity of the token after transmission, for example when needed by the user 24 and the registration location 14.

In the following, this phase of preparation and token generation/transmission will also be described in more detail in steps V1-V5 and V1*-V3*.

A subsequent phase relates to the registration at the registration/validation location 14. The following steps can be performed in this phase:

Typically, the user 24, if interested in using a service of the log-on location 16, will query the log-on location 16, which again refers him to the registration location 14. Alternatively, the user 24 can also be informed at the registration location 14 about the different log-on locations 16 connected to the location 14.

In this step, the proof of identity of the user 24 is performed at the registration location 14 (cf. step 54). Thereby, it is ensured that later only users having passed a process of legitimacy proof which is defined and reliable for the service provider/log-on location 16 can successfully complete log-on.

The mode of the identity proof can be selected almost arbitrarily. One option is the usage of existing qualified certificates: all qualified certificates whose central certification instance (CA) is trustworthy, are accepted.

When this step is completed, the same can be repeated several times for several log-on locations (service providers) 16 connected to the registration location 14—provided that the same have generated respective token pools and transmitted them to the registration location 14. For this purpose, however, the central registration location 14 should agree on suitable authentication methods with the user 24 (standard methods) to allow renewed log-ons 54; 84.

The usage of certificates can easily be replaced by other identification options, such as proof via passport 26 etc. Of course, existing methods for proof of identity can be reused, or the suggested method is integrated into the respective system.

Apart from the registration of users 24, registration of devices/software etc. is possible, even if the methods used for this will be slightly modified.

The phase of registration at the registration/validation location 14 will be discussed in more detail below with regard to step R1.

Subsequently, a phase of token allocation via OT protocol takes place. In this phase, the following can be performed:

In this step, after selecting the desired log-on service by the user 24, the token necessitated for the subsequent registration/log-on at the respective log-on location (service provider) 16 will be transmitted to the user 24 via OT (cf. steps 56; 86). By using OT, decoupling of the "natural" identity from the identities/pseudonyms used later at the respective log-on locations 16 (service providers) takes place. After that, if needed, only the user 24 is able to connect both identities, the registration location 14 and the log-on location 16 will not able to do so, even if they cooperate against the user or if third parties gain access to the respective data, wherein, as mentioned above, possibly a certain time offset should exist between registration 54; 84 and the later log-on 58; 88, or a sufficiently large number of prompt log-ons. Insofar, users 24 could/should be informed that registration "in advance" is useful, according to the motto "register first and then log-on sometime later at potentially numerous services".

A so-called 1-out-of-n Oblivious Transfer protocol can be used, for which several variations exist, e.g. Rabin OT, Even-Goldreich-Lempel OT and Naor-Pinkas OT (used in DA). Oblivious Transfer allows transmitting partial information such that the transmitter 14 (mathematically provable) will not be able to find out which partial information is transmitted, and it is ensured at the same time that the receiver 12; 24 receives only the selected partial information.

The token is stored on the user side 12; 24, wherein common security measures as are common with private keys, can be applied, etc., e.g. PKCS#12 (Public Key Cryptography Standards Number 12).

The log-on location 16 can designate in advance whether one or several pseudonyms per identity will be possible at the respective service.

The central registration location 14 can store information on which user 24 has requested tokens for which log-on location 16.

In the following, this phase of token allocation via OT protocol will be described in more detail with regard to step R2.

Finally, a log-on phase or subsequent registration phase via token takes place.

Here, the following can apply:

In this step, the log-on or subsequent registration (58; 88) takes place at the log-on location 16. By using tokens, it is ensured for the log-on location that the users 24 are authorized. Actually, the term registration can also be used instead of log-on, since in the most cases of application during this step a pseudonym, nickname, log-in including password, certificate etc. specific for the service provider 16 allocated, namely in step 62 or 96. The method for allocating these IDs, access protection, etc., can be freely selected by the service provider 16.

A token is advantageously not used for a log-on, but once for entering a provider-specific log-on method, since otherwise the danger of token theft exists, and passing on of tokens can actually be opposed only on the level of the business model at the service provider 16, but not on a technical level.

In order to ensure that no "identity theft" takes place and in order to provide a uniqueness of user identities for the different areas of application, used tokens are "blocked" and cannot be used again for renewed log-ons to the same log-on location 16 (service provider).

At the same time, it should be ensured that token pools can be renewed when a respective large number of tokens is used, and that still no attack options regarding privacy protection arise by the respective step.

For obtaining the stated targets, basically two different options exist, possibly after verification of authenticity of the token via an optional digital signature, optionally also serving for simple management of the tokens on the client side, since, for example, information regarding the log-on location 16 etc. are included:

1. A Zero-Knowledge method (e.g. Ohta-Okamoto-Zero-Knowledge) is used for mathematically proving to the log-on location 16 that the user 24 has a valid token WITHOUT having to transmit the token itself or any other information. This method is to be favoured for data protection reasons. Here, information derived from the token which is unique (but cannot be traced back to the token) is generated at the log-on location 16. Thereby, the log-on location 16 can detect multiple log-ons with the same token and prevent them without receiving the token itself. The stated advantages manifest themselves only in the above-mentioned variation in FIG. 2, where the tokens are generated centrally at the registration instance 14, since in this way a separation between token and derived information is obtained. In the case of token generation at the log-on location 16, only the advantage of transmission security is maintained, since the log-on location 16 can, when simultaneously generating and storing the derived tokens, despite using a one-way function, establish a connection between values corresponding to each other in pairs. After successful log-on or registration, the service can use its own IDs and authentication methods for further log-ons. This variation will be described below under (A1).

2. The token is directly transmitted by using a one-way function or in another way, which allows the detection of multiple log-ons at the log-on location 16, otherwise see above. This variation will be described below under (A1*).

Apart from ensuring a respective pool size (cf. above) for avoiding multiple provision of tokens to several authorized users, it is optionally possible that the log-on location 16 transmits the tokens or information derived therefrom to the registration location 14 after log-on/subsequent registration, which then removes the tokens from the pool, as it is the case in FIG. 3.

In order to intercept the more or less extremely unlikely case of random multiple provision of identical tokens to several authorized users, depending on the constellation, instead of simply avoiding multiple log-ons, the following method can be used: In the case of multiple log-on, the log-on location 16 issues a request signed by the same, with which the user can have a new token issued at the central registration location. The registration location 14 validates the request and outputs a new token to the user 24 authentified by the same, wherein it obviously verifies whether the user has previously made a request for the respective log-on location 16.

By the described steps, it is ensured that no multiple logons take place with the same token. In order to keep the probability of random multiple provision of the same token very low, after using a previously defined large number of tokens the token pool can be renewed (cf. token generation and transmission).

According to the just-mentioned description for options of pseudonymized log-on, a division into four phases has been used, namely preparation and token generation/transmission, corresponding to the first two steps in FIGS. 2 and 3, registration at the registration/validation location, corresponding to steps 54 and 84 of FIGS. 2 and 3, token allocation via oblivious transfer, corresponding to steps 56 or 86 of FIGS. 2 and 3, and log-on or subsequent registration via token, corresponding to the subsequent steps according to 56 or 86 in FIGS. 2 and 3.

In the following, a few additional remarks to the four phases are made, which have been briefly discussed above:

A verification of identity that has taken place once at the central registration location, can take place for subsequent log-on/registration at all log-on locations (service providers) that are connected to the registration location and have previously transmitted token pools. Therefore, merely a renewed authentication of the user at the central registration location is necessitated.

The described method basically supports also the solution of pseudonyms and issuance of new pseudonyms in response to user desire and blocking/deleting of pseudonyms by the log-on location.

Above that, an integration in so-called "ID federation" systems is possible, where a pseudonym generated once cannot only be reused at one service, but at many services.

Finally, the above already mentioned variation should be mentioned again, according to which token generation 50 can also take place at the registration location 14, in which case token generation 50 is performed with possible signature by the central registration instance 14, provision of tokens via OT to the user takes place (cf. 56), subsequent user registration/log-on with token takes place at the log-on location 16 (cf. 58-62), wherein the authenticity is verified by the log-on location 16 via signature and double log-ons are detected, wherein a ZK protocol can be used or not.

Again, another variation corresponds to the one of FIG. 3, according to which even the token management took place on the side of the registration location 14. The advantages of this last stated variation can be summarized as follows:

A potentially much larger central token pool lowers the probability of random multiple provision of a token. Also, it becomes much harder for a system of log-on and registration locations acting against the user to allocate a real user identity to a small amount of tokens.

Deleting the tokens would take place centrally at the registration location and hence also reduce the logistic effort of deleting and generating tokens, since the registration location can renew the pool independent of different log-on locations.

Application Scenarios

In the following, possible application scenarios are described for the above-described embodiments of pseudonymized log-on.

Data Mining/Collaborative Filtering

One application scenario for "privacy enhanced authentication" (or pseudonymous authentication) is the case of Data Mining, i.e. specifically searching for and detecting patterns in different data inventories. This is in particular about person-related data or usage data of users of diverse systems (e.g. when processing medical information, collecting and processing usage data and user preferences, etc.). Here, data protection can play an important role due to the respective legal regulations and in many cases, beyond that due to the users interests. Thus, it is necessitated to protect the privacy of the users, if possible so much that due to the sought-through and analyzed data no conclusions to the identity of the user are possible. On the other hand, a differentiation of users has to be possible for performing data mining.

For collaborative filtering, similar requirements apply: It has to be possible to combine into specific groups, i.e. the same have to be differentiated within groups.

Also, the right to data protection privacy of users applies: during processing and evaluating the data, no allocation to the real identity of the user may be possible.

User Authentication

In the case of user authentication, it matters that a user wants to access services or resources or wants to participate in a system. The system has to verify the claimed identity of the user in order to authorize the respective actions. Here, data protection also plays an important role: the system should not obtain the real identity of users, but should be able to differentiate frequently between users or groups of users.

Authentication of Metadata

Here, authentication of metadata means it has to be proven that metadata originate from the claimed source and have not been manipulated since generation or occurrence. The metadata generated by the user (or respective devices/software) or related to the same should allow no conclusions to the real identity of users (or also devices, etc.), on the other hand, here, differentiation according to groups of users or even users can be advantageous.

E-Voting (Revenue Sharing)

In this case, "voting" should be possible (frequently limited per user and hence necessitating differentiation), without allowing conclusions to the real identify. Above that, if needed, a user should be able to verify whether the vote has been counted. This can, for example, be used for distributing existing resources in a distribution system based on evaluation: digital goods are offered in the system and can be evaluated by users and based on the evaluation, payment to the author/"producer" takes place.

Pseudonymous Usage of Personalized Services

In this application scenario, personalized services are to be used in a pseudonymous manner. The background is that more and more services are offered which are tailored to a specific user and hence necessitate user differentiation, e.g. personalized music recommendations based on the individual taste of music or product recommendations based on the buying patterns. On the other hand, it is in the interest of the users that these data are protected and can be connected only with a pseudonym but not with their real identity.

Authentication of Devices

This application scenario corresponds to the case of user authentication, wherein here it is about devices or applications participating in a system instead of real users or persons. These devices and applications are here treated like users and connected to a pseudonym, corresponding conclusions to the devices (hence possibly indirectly to respective users) is avoided. One example for this can, for example, be that an iPhone application generates user-related information, which is to be statistically evaluated.

ID Management

An ID management system (briefly IdM) can be interpreted as system (see Figure), managing one or several identities of users for different log-on locations (potential service providers). The objects of the system extend from pure management of identities via using interoperability between different authentication methods up to combining or matching and managing several identities under a further pseudonym (ID Federation). Here, an IdM system realized with the help of "pseudonymized authentication" has here the characteristic (and respective advantages) that the ID or IDs of a user remain decoupled from his real identity in order to ensure maximum privacy protection. This will be described in more detail below:

Here, participation in the system can take place as follows:

A user 24 registers at a registration location 14 in the system. Thereby, exactly one registration location exists per system (idealized assumption).

For registration, a valid digital certificate issued by an external CA is used, which proves the real identity of a user 24. Alternatively, it is also possible to use a previous proof of identity.

After verifying the identity 54; 84, the user 24 receives a token in accordance to "privacy enhanced authentication" by means of oblivious transfer, which allows decoupling of ID and real identity.

With the help of this token, a user 24 logs on to a log-on location of the system. Thereby, potentially, several such log-on locations can exist.

The tokens which have been used for log-on can be locked or deleted 60; 92 both by the respective log-on location 16 as well as the registration location, in order to prevent renewed log-on with the same token. In what cases and how such a deletion or blocking takes place will be shown in the next sections.

For systems and components, several possible constellations exist:

A user 24 can participate in exactly one system with a single identity. Here, the user receives exactly one token during registration 56; 86, which he uses when logging on to the system.

A user 24 can use different log-on locations 16 with one ID. Here, there is the option to transmit several log-on location-specific tokens to the user. Thereby, the registration location 14 would remember during first registration which log-on location the user has been used. Subsequently, the user can request further tokens for further log-on locations 16 or, when losing or compromising an ID, also request a new token for an already used log-on location 16 (ID Federation).

A user 24 can participate in a system and a single service with several IDs (IdM).

A user 24 can participate in several systems and services with several IDs, wherein the number of IDs can be unequal to the number of systems and services (IdM).

A user 24 can participate in several systems and services with a single ID (ID Federation).

For obtaining this, the described methods and components for pseudonymized authentication are integrated in existing IdM systems (e.g. via Enterprise Sing-On-Engine ESOE or Liberty Alliance).

Additional Variations/Comments

In the following, again, summarizing statements regarding the above-described embodiments will be made. The process of pseudonymized log-ons will sometimes also be referred to as privacy enhanced authentication below.

Central parts of privacy-enhanced authentication are, among others, the oblivious transfer protocol obtaining decoupling of ID and real identity. Deleting used tokens on the side of the log-on location 16 avoids multiple log-ons. Optionally, deleting used tokens can also be performed at the registration location, which prevents transmission of a token to two different users.

As described above, using the Zero-Knowledge method is optional. Advantages are: the user does not have to transmit his received token directly to the log-on location. Thereby, the token has certain characteristics of a private key. The token has to be kept secret by the user. Further, the method provides the advantage that the log-on location is able to verify whether the user has a legal token, but at the same time does not know which token the user has. Above that, the log-on location is still able to differentiate between individual users.

When a Zero-Knowledge method is used for steps 58 or 88 of FIG. 2, this can be performed in the following way:

1. The log-on location 16 generates the token randomly. The same need to have the form $t\_i = g^i$, wherein $t\_i$ is the ith token and g a generator of a cyclic group $Z\_q^*$. Hence, the following applies: $t\_i \in Z\_q^* \forall i \in \{0, \ldots, q-1\}$.

2. The token pool is transmitted to the registration location 14, which additionally selects a random element b from group $Z\_q^*$.

3. When allocating tokens to users, the registration allocation 14 transmits, in addition to the token not known to it (see OT), also the value b to the user.

4. During log-on of the user to the log-on location, the user 24 wants to prove that he owns a legal token by means of the described Ohta-Okamoto Zero-Knowledge protocol. For this, the user takes his token as input and the value b as exponent for the method.

5. Thus, the token itself is not transmitted, but only a value derived from the token. This value ($g^{ib}$) is stored by the log-on location 16 in order to detect and block renewed log-on with the same token.

6. Thereby, the log-on location 16 is not able to find out from the existing tokens and the received values $g^{ib}$ what token this is (see Diffie-Hellman assumption).

Regarding the involved components of the scenario of FIG. 1, the following should be mentioned:

External components could be provided that are not shown in FIG. 1. Part of this could be, for example, a certification authority (CA). This certification instance could be able to issue qualified certificates based on a correct proof of identity, such as photo identification or the same. These certificates could be used in the system of FIG. 1 for registration, which means as proof of identity. Respective CAs are considered by the system as just third parties.

Further, an upstream location could exist for the proof of identity. The proof of identity could be performed upstream, for example by a personal verification of identity, as has already been described with reference to FIG. 1. Thereupon, the user needs to obtain information, which recognizes him in the system as valid user.

The following system components of FIG. 1 have already been described:

System 10: The overall system is a combination of the following components. Potentially, several systems can exist which can interact among one another.

Registration location 14: The system can have exactly one registration location, which serves to verify the identity of a user and to issue and manage tokens.

User 24: A natural person or representing User Agent (or similar), wanting to participate in the system.

Log-on location(s) 16: At this location, the users 24 log on once with their received token for obtaining a pseudonym and to move within the system with the help of the same. Potentially, several log-on locations can exist in a system.

In the following, the ratio of users 24 to the number of pseudonyms will be discussed.

There is the option to dictate the number of allowed pseudonyms for the user. Thereby, the respective log-on location decides prior to system start, how many pseudonyms it wants to allow for every user. There are motivations for the following two cases.

The user may own exactly one pseudonym in a system at a log-on location.
i. In this case, log-on location-specific reissuing is not allowed, i.e. the registration location 14 remembers which user has obtained a token for which log-on location 16 and issues no new token for the same log-on location 16.
ii. Communication between log-on location 16 and registration location 147 for the purpose of blocking tokens is not necessitated.
iii. After a number of performed registrations determined in advance, depending on the size of the calculated token pool, the registration location 14 requests a new token pool.
iv. The calculation of the threshold is as follows:
1. The probability of sending an already distributed token a second time is p=(# of performed registrations)/(# of tokens in the token pool)
2. If this probability exceeds a certain threshold (e.g. 1%), a new token pool will be requested.

A user may have several up to any mount of pseudonyms in a system at one log-on location 16.
i. In this case, re-issuing is allowed, i.e. when a user wants a second ID or an additional profile, he can request a further token at the registration location for this purpose.
ii. The registration location 14 remembers the number of issued tokens per user, hence, a limitation of IDs per user is possible.
iii. In this case, communication between log-on location 16 and registration location 14 has to take place, otherwise it would be possible that two users 24 unintentionally receive the same token and the log-on location 16 blocks this token after the first usage and the second user then has no option anymore to successfully log on to the system.
iv. Here, the token pool also has to be renewed after reaching a certain threshold.
v. Calculation of the threshold is similar to the first case:
1. S=(# of tokens blocked by the log-on location)/(# of tokens in a token pool)
2. When S reaches a specific value, a new token pool is requested.

Number of Log-on Locations per Registration Location

A possible system configuration for the embodiment of FIG. 1 intends that only one registration location 14 exists. For the number of possible log-on locations 16, the following can apply:

Only exactly one log-on location exists in the system.
i. In this case, as described above, there is the possibility that one or several pseudonyms are allowed for every user. Thereby, the log-on location has to determine prior to system start which of the two above-mentioned possible constellations it wants to use.

Several log-on locations exist in the system.
ii. In this case, every log-on location has to decide whether it wants to allow one or several pseudonyms per user. For the case that only one pseudonym is allowed, the registration location has to implement communication and management of the pool or for the case that exactly one pseudonym per user is allowed at one log-on location, presented for all these log-on locations. For all other log-on locations wanting to allow several pseudonyms, system communication is implemented as above briefly sketched. Here, every log-on location can determine in advance how many pseudonyms are to be possible, since exact limitation is possible due to storing the number of already issued tokens for users per log-on location.

For the case that all log-on locations only want to allow one common pseudonym for each user, i.e. that the user can log on to all log-on locations with his single pseudonym (ID Federation), the scenario of ID management is applied.

Regarding potential attack options, the following statements are made. Attackers cannot control everything that is happening on part of the user 24 in the above embodiments. However, the log-on location 16 could use specifically selected or manipulated tokens for fulfilling the identity of users or for obtaining information on the identity. The token could be stolen. It would also be possible that an attacking user does not need to have, for the optional ZK method, the value "b" determined by the registration location 14 for proving that he owns a valid token, but another manipulated value in order to possibly use the same token several times.

Method (in Detail)

In the following, the embodiments of the present invention will be described again in other words. Thereby, the term "credential" is synonymous to "pseudonym" or "pseudonym token". Compared to the division into four phases of the above description, additionally a division into only three steps is performed, wherein the second step corresponds to the second and third phase of the previous division into four phases.

1. Preparation: Generating Output Values, Prime Numbers and Credentials (Protagonists: Registration Location, Log-on Location)

Registration location (Trusted Third Party!) and log-on location (integrated in the service or "close to the service") communicate with each other for the purpose of selecting output values and generating prime numbers for performing the later following oblivious transfer and Zero-Knowledge protocols: depending on the type of usage, the output values and "credentials" can be selected randomly (any random generator) or can be selected by means of an appropriate algorithm or self-determined rules. The prime numbers necessitated for the protocol are generated by means of appropriate prime number generators. The output values and prime numbers are generated and possibly exchanged depending on the variation of the protocol either at the log-on location or at the registration location, analogously to the requirements of existing oblivious transfer and Zero-Knowledge methods.

A sufficiently large amount (pool) of "credentials" possibly (for several applications also mandatorily) differing in pairs, is generated at the log-on location and signed with the help of their private keys (the public key is notified to the registration location). In the following, an element of the amount of "credentials" is also referred to as partial information.

2. Registering a User (Protagonists: Registration Location, User)

The real identity of a user/protagonist to be registered can be verified by any SOTA methods, e.g. via validating existing qualified certificates. When the validation has been successful, the following step is decisive: using a so-called oblivious transfer protocol (so-called 1-of-n OT with n as large as possible, methods are, among others, Rabin-OT, Even-Goldreich-Lemple-OT or Naor-Pinkas-OT), partial information (also one "credential") of the amount of "credentials" generated in a step 1 is transmitted to the user. By using the OT protocol it is, on the one hand, ensured that the registration location can not know which partial information has been transmitted to the user, and, on the other hand, that the receiver only receives the selected partial information. Thus, this step provides for "decoupling" real identity and partial information by maintaining the option to still be able to differentiate between user identities.

Variation: as far as usage of several pseudonyms per user is desirable, depending on the respective case of application, in this step, a so-called m-n-OT protocol can be used, allowing a simultaneous transmission of several partial information that are all decoupled from the identity as well as among each other in pairs. In this case, the first log-on described in step 3 will be performed several times (once per partial information).

3. First Log-on of a User to a Service (Protagonists): Log-on Location, User)

Remark: For all following communication steps between the log-on location and user, the usage of anonymization services, e.g. TOR, etc.) is recommended for avoiding possible conclusions to the real identity of the user via context information (IP address, etc.).

The first log-on of a user at a service takes place with the partial information received in step 2. For this, different variations exist:

Proving the existence of the partial information at the user can be realized by using a so-called Zero-Knowledge proof (e.g. Ohta-Okamoto-ZK, basically, many other ZK proofs can be used). Here, the user proves to the service the ownership of the credential, without giving away any other information that could be useable for the log-on location (or also by third parties listening into the communication). Due to its security advantages, this variation is of particular interest.

The partial information can also be encrypted with the public key of the log-on location at the user side and transmitted to the log-on location, where the same decrypts it again with its private key. Alternatively, standard key exchange methods can be used, such as the Diffie-Hellman-protocol, as long as the same have no specific disadvantages regarding privacy protection of the user.

Subsequently, the log-on location verifies the authenticity of the signed partial information by applying its own public key. After successful validation by the log-on location, the partial information can be marked as "used", wherein after using up a defined amount of partial information pool is replaced (analogously to the respective section in step 1). The log-on service can now allocate a unique ID to the user.

After this verification of "legitimacy" of the user, the actual log-on can take place. Here, existing methods for user authentication can be used, e.g.:

1. Password-based authentication: Here, the user transmits possibly a log-in name/pseudonym (alternatively, the log-on service can also issue a name/ID) and passwords to the log-on service, for security reasons advantageously not in clear text (cf. for example basic authentication) but with the help of hashing methods (cf. e.g. digest authentication). Alternatively, it can also be useful here to perform a proof of existence with the help of a ZK protocol instead of simple transmission.

2. Public key or certificate-based authentication: Here, a pair of keys is generated on the user side and the public key is transmitted to the log-on location. Above that, the log-on location can then issue a respective pseudonymized certificate to the user. For proving the existence of the respective private key on the user side, usage of a ZK protocol can also be useful here.

Basically, this process can also be repeated, and then several interconnected virtual identities result with respect to one and the same partial information.

Future log-ons of the user to the log-on service by using the respective identity can now be performed based on the above-mentioned information, i.e. at (1) with login name/pseudonym/ID and password, at (2) by using the public key or certificate and private key of the user. In this way, it is ensured on the one hand that the log-on service cannot only authenticate the users, but can also uniquely allocate them and differentiate between them. But he is definitely not able to draw conclusions on the real identity of the respective users (under the prerequisite that the user does not reveal information on himself in any other manner which can, however, be avoided by using anonymization tools and by respective behavior). This privacy protection of the user holds true even when registration and log-on location cooperate or the log-on location reaches the data stock of the registration location in any other way. Merely the user himself (for example in specific emergencies) is able to prove the connection of his real identity with the pseudonym/key.

Using public key cryptography (PKC) or certificates in method (2) (public key or certificate-based authentication) is particularly useful since numerous interesting areas of application can be realized beyond pure user authentication and authorization of actions based thereon. Thus, the generated pair of keys can be used for authentication of user-generated data and for confidential communication. At the same time, the advantages regarding data protection are maintained. The areas of application for this are, for example, authentication of data in distributed systems, reliable and data protection friendly evaluation of user and usage information and many other areas.

Protocol Descriptions

The following, mathematically grounded illustrations of possible protocol implementations for registration and log-on of the embodiments will be developed, fulfilling the described requirements (a) to (e). Thereby, possible variations for protocols are presented. Therefore, the following mathematical symbols are used:

| | |
|---|---|
| $p, q$ | p and q are two large prime numbers, i.e.: $p, q \in P$ |
| $(G, \circ)$ | G is a group with the operation $\circ$ |
| $|G|$ | Cardinality (power) of a group |
| $Z_N$ | $(Z_N, +)$ is a cyclical group with $N \in \mathbb{N}$ |
| $Z_p$ | with p prime number: residual class body modulus p |
| $Z_N^*$ | with $Z_N^* := \{a \in Z_N \mid ggT(a, N) = 1\}$ is $(Z_N^*, \circ)$ a multiplicative group |
| $Z_p^*$ | $Z_p^* := Z_p - \{0\}$ with prime number p |
| $\phi(N) = |Z_n^*|$ | Group order, Eulerian Phi-function |
| $\oplus$ | XOR-Operator (exclusive or) |
| $a|b$ | a divides b |
| $G \cong H$ | The group G is isomorph to group H |
| A | Log-on location in the protocols |
| R | Registration location in the protocols |
| U | User in the protocols |
| PKI | Public Key Infrastructure |
| $A = \{0, 1\}$ | Alphabet with elements 0 and 1 |
| $A^* = \bigcup_{i=0}^{\infty} A^i$ | Kleene termination of amount A |

For fulfilling the stated requirements, separation of registration and log-on is useful. Due to the separation, the service now only consists of log-on and the functionalities possible based on the log-on. Since the registration is no longer bound to the service itself, it is basically possible to participate in several services with one registration. The conglomerate of registration location and the different services will be referred to as system below.

After registration, the user needs information with which he can log on to the service, i.e. whose ownership he can prove. This necessitates the usage of different cryptographic methods. The methods used in the next two sections will now be briefly described.

A method used in this context is the so-called Oblivious Transfer Protocol. It is to allow the provision of log-on information to the user. Oblivious Transfer is an approach that is to allow two or more parties to obtain parts of an information without the transmitter R finding out which part a receiver U has selected and without U finding out more than has been agreed on in advance. The amount of Oblivious Transfer Protocols is referred to by $$O_n^m$$

m—number of parts, n—number of parts selected by the receiver. The designation $OT_1^2$ means, for example, that V's secret consists of two parts of which U can select one, which he will then find out.

For this, R generates two public key/private key pairs and announces which public key belongs to which partial information. U generates a key for a symmetrical method. He codes the same with the public key belonging to the part he wants. R receives the result and decodes it with the respective private key. Now he uses the two obtained (potential) keys for coding the two parts of his information and transmits those to U. he can decrypt the part selected by him with his key (and obtains no useful text in the second decryption.

In the context described here, an extension of $OT_1^2$, $OT_1^N$ is used. An efficient protocol herefore is described, for example in [NP01].

Apart from Oblivious Transfer, another method of modern cryptography is used. This is a Zero-Knowledge method (or also Zero-Knowledge proof). With such a proof, the user is to prove the ownership of the log-on information. A Zero-Knowledge proof has the characteristic that someone can be convinced of the correctness of a statement without telling him anything else apart from the fact that the statement is correct. From the history of mathematics, a nice interactive proof is known:

Authentication Protocol, Variation 1

The first variation of the protocol uses Oblivious Transfer (cf. [NP01]) and an interactive Zero-Knowledge method by Ohta and Okamoto (cf. [0088]). In this protocol, three parties interact with one another. On the one hand is the user (U), who wants to register at the provider. On the other hand is a registration or validation location (R) taking on registration and validation of the user, and a log-on location (A) authenticating and authorizing the user for his sessions to use the offer of the provider. In order to perform a registration, the user needs to have been issued a qualified certificate by a reliable certification instance.

The basic idea of this protocol is that A looks for different information (secrets) or generates the same and one of them reaches U via R. With this secret, U logs on to A by means of a Zero-Knowledge method. The Zero-Knowledge method is used so that A finds out nothing about the user or even his secret. In order to avoid malicious cooperation between A and R, an Oblivious Transfer protocol is used, which ensures that R is not able to find out which of the secrets U has received and hence also cannot collaborate with A.

Basically, the protocol runs in three phases. These are a preparation phase, registration in the system and the first log-on. There are two variations for the preparation phase.

Figure 4:
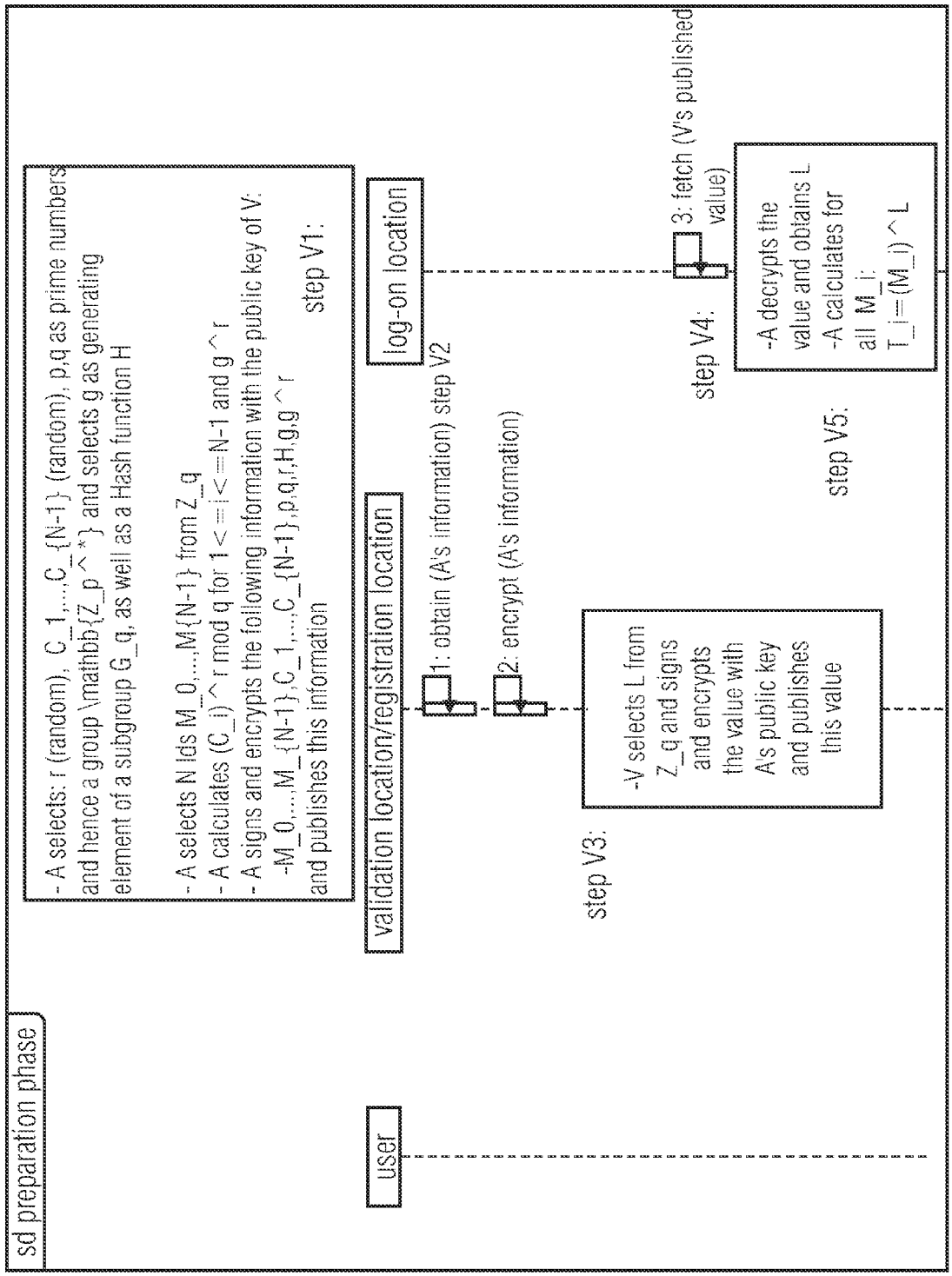
FIG. 4 is a sequence diagram of the first variation of the preparation phase of an authentication protocol (authentication protocol 1) according to an embodiment.

Preparation Phase Variation 1:

In the first variation illustrated in FIG. 4, the log-on location prepares for the following methods. This preparation phase is illustrated in FIG. 4. Here, A selects two large prime numbers p and q with $q|(p-1)$ to work on the groups $(Z_p^*, \cdot)$ and a subgroup $(G_p, \cdot)$ of the order q with the generating element g (i.e. the group $(G_p, \cdot)$ consists of powers of g modulo q). Also, A selects a cryptographic hash function H necessitated in the Oblivious Transfer method, as well as a number $r \in Z_q$. A again selects N different information:

$$M_0, \ldots, M_{N-1} \text{ mit } M_i \in Z_q \forall i \in \{0, \ldots, N-1\} \tag{1}$$

and N−1 random constants $$C_1, \ldots, C_{N-1} \in Z_q. \tag{2}$$

The log-on location then calculates $C_i^r \mod q$, for $1 \le i \le N-1$ and $g^r$.

In this phase, there is no direct message communication. The following described indirect communications are still treated like normal message transfers:

Step V1: The information $$p, q, H, g, r, g^r, C_1, \ldots, C_{N-1}, M_0, \ldots, M_{N-1} \tag{3}$$

are signed by A and encrypted with the public key of R. Here, it is assumed that all participating parties have their own pair of keys. Then, the collected data are published on a server accessible for R.

Step V2: The registration location R fetches the information intended for it by A from the server and decrypts the same with its private key.

Then, R verifies the signature of the data with the help of the public key of A. If the signature is confirmed, R selects a random number $L \in Z_q$. This value is signed and encrypted by R such that only A can decrypt the value and then verify the signature of R.

Step V3: R stores L on the same server that has been used by A.

Step V4: A fetches L from the server.

With this value, A makes a last preparatory calculation necessitated in the Zero-Knowledge protocol for verifying the information.

Step V5: The log-on location calculates $$T_i := M_i^L, i=0, \ldots, N-1 \tag{4}$$

Therewith, the preparation phase is completed. However, there is also the option to implement the preparation phase differently. In the above described variation, this phase is performed exclusively by A, but it is also possible that both parties perform this preparation phase together.

Preparation Phase Variation 2:

In this case, A only selects the information
p, q, H, L, $M_0, \ldots, M_{N-1}$.

However, these are now not published on a server but directly transmitted to R. With this adaptation, only one communication step is necessitated.

Step V1*: A transmits the information
p, q, H, L, $M_0, \ldots, M_{N-1}$
to V.

V then performs the rest of the preparation phase. This means, in a further step, the registration location R selects the random numbers $C_i$ necessitated for Oblivious Transfer with $i=1, \ldots, N-1$.

Step V2*: R selects randomly and equally distributed values
$C_1, \ldots, C_{N-1}$.

As a last step in this variation, the log-on location calculates again the value necessitated for verifying secret information, i.e. this step is identical to V5.

Step V3*: The log-on location calculates $$T_i := M_i^L, i=0, \ldots, N-1. \tag{5}$$

Figure 5A:
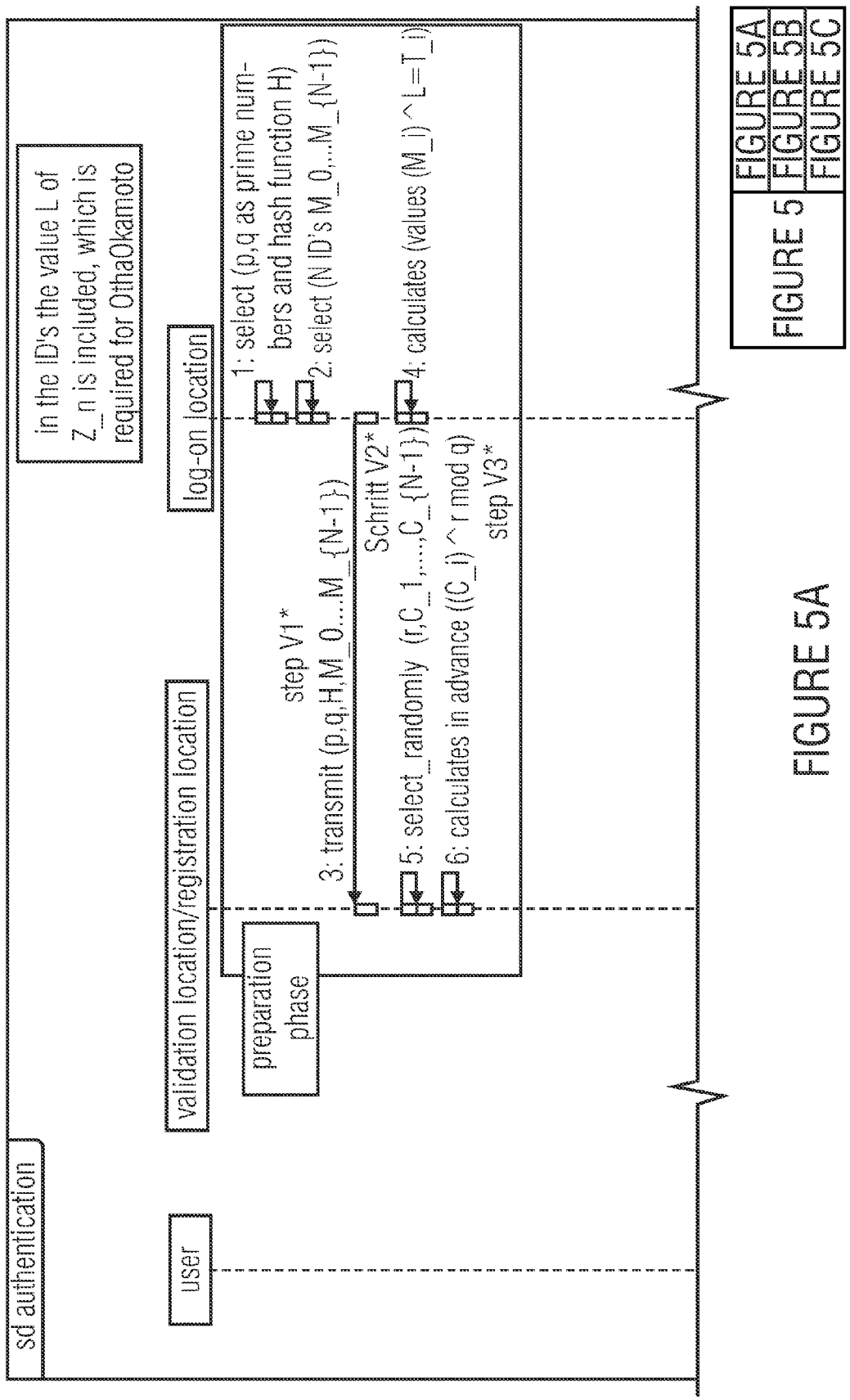
FIG. 5 is a sequence diagram of an authentication protocol (authentication protocol 1 with the "second variation" of the preparation phase, see below) according to an embodiment.
Figure 5B:
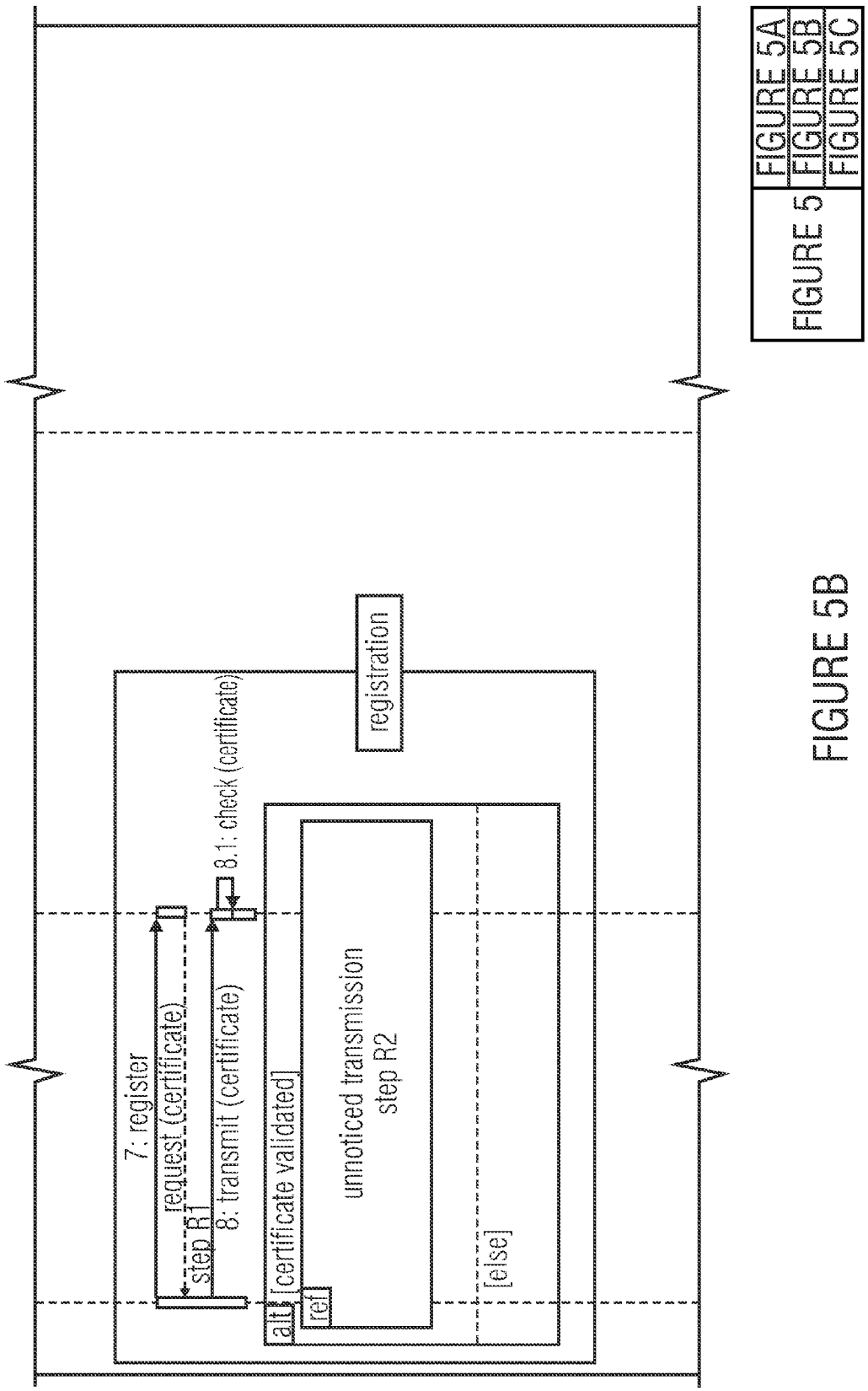
Figure 5C:
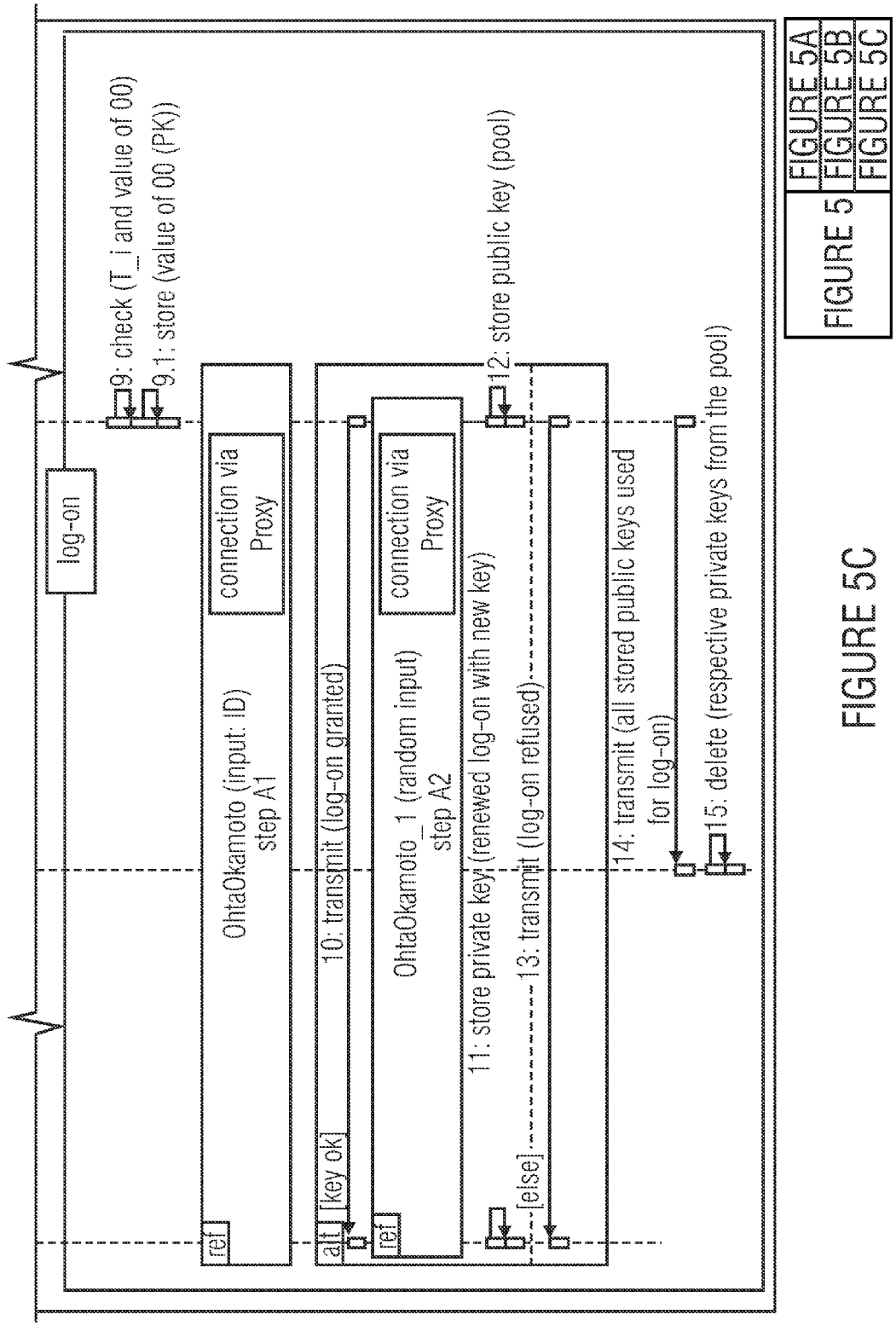

The advantage of the above-described variation is that the communication runs indirectly. Thus, this communication is time-independent and R does not have to wait for input from A. However, it is an advantage of this second variation that the selection of different random numbers is not performed by one location and hence cannot be manipulated by a single location. A further advantage is that now no communication channel exists from R to A, which existed in the first variation, even when indirect. Thus, in a further process of the protocol, the second variation of the preparation phase is used. FIG. 5 shows a sequence diagram, illustrating the course of the second variation of the preparation phase, registration and log-on.

Registration:

Now begins the actual registration where the user requests registration at a provider and the registration location V, which takes on the registration, requests a valid, i.e. a qualified digital certificate from U. With the usage of certificates, requirement (d) is fulfilled.

Step R1: U sends his certificate to the registration location V.

The same validates the certificate (how this works is described in section). Thereby, the actual registration is completed since the certificate includes all necessitated information on the user. The next step serves to fulfill requirement (c) for pseudonymization. After the certificate has been verified, R starts the Oblivious Transfer protocol.

Step R2: Parties U and R perform the Oblivious Transfer protocol, with R as transmitter and U as receiver or voter.

This protocol consists of several sub-steps. At the end of the protocol, the user has obtained information $M_\sigma$ from R. With performing the Oblivious Transfer, the protocol is almost completed.

Figure 9A:
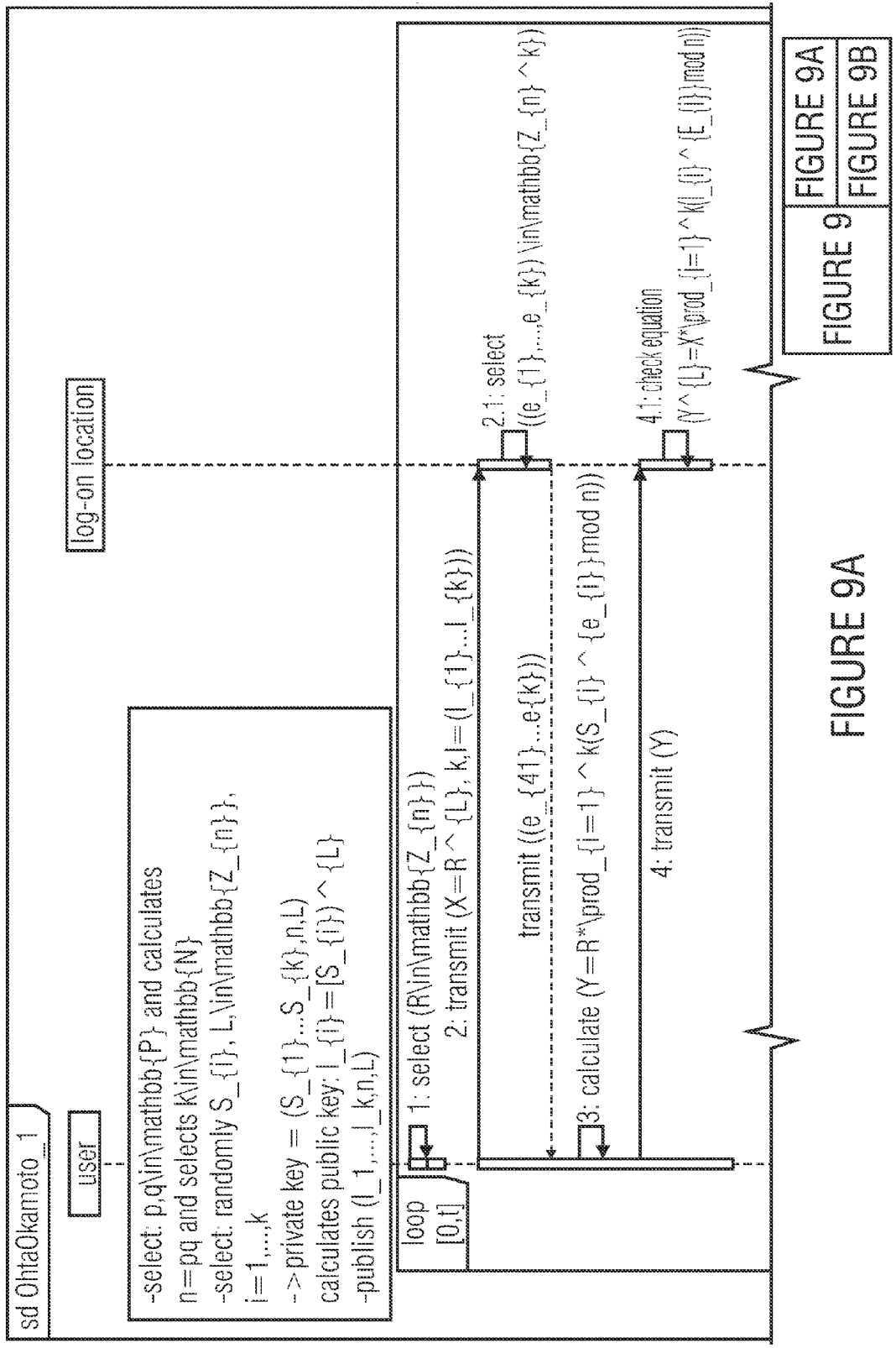
FIG. 9 is a sequence diagram of an Ohta-Okamoto Zero-Knowledge Protocol according to an embodiment.
Figure 9B:
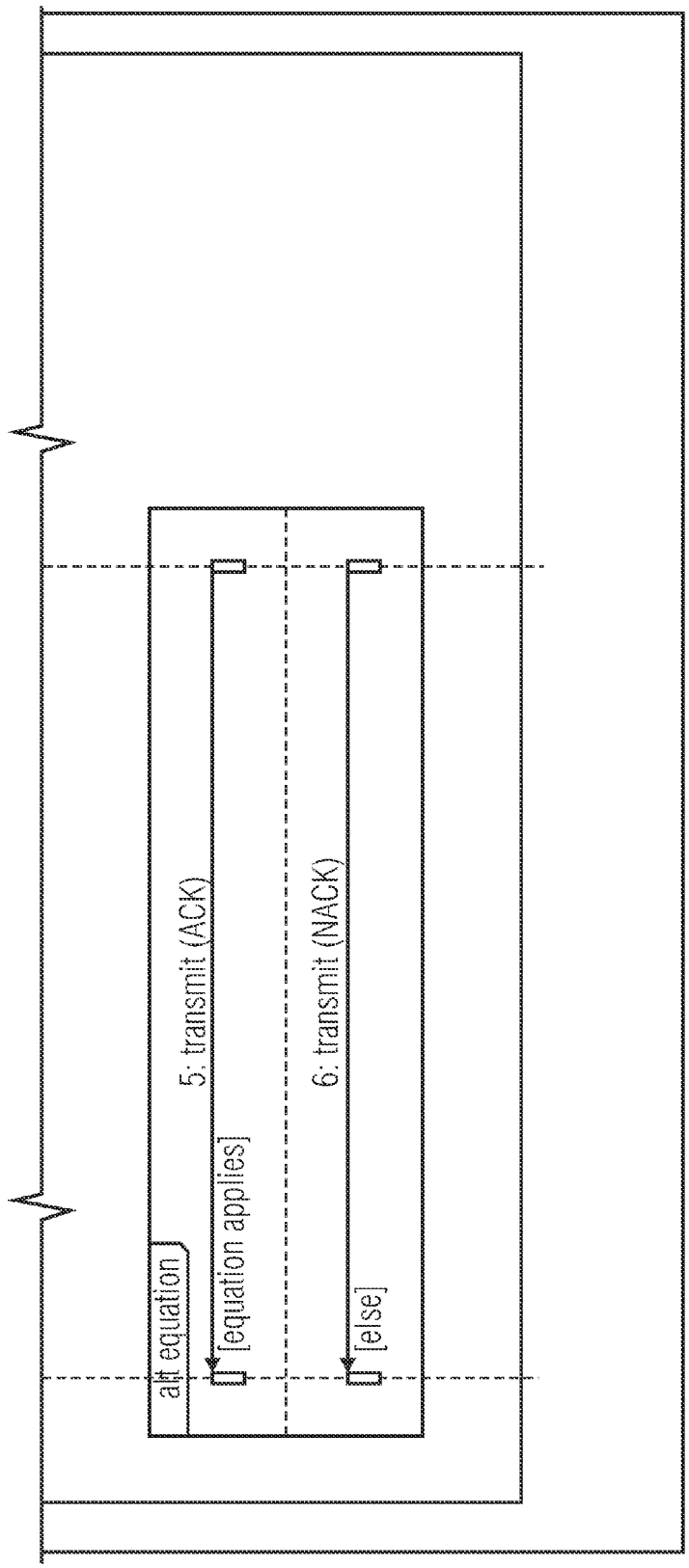

Log-on Phase:

As a last step, the user has to log on to or authenticate at A. This is performed by the Ohta Okamoto Zero-Knowledge Protocol, so that A finds out nothing more about U except the knowledge that U possesses information obtained from R and is hence authorized for logging on. The used method (cf. [0088]) necessitates the information $M_\sigma$ that U has obtained from R as input (as some sort of private key). The method is illustrated in FIG. 9 as a sequence diagram.

Step A1: The user performs the Ohta-Okamoto-Zero-Knowledge Protocol with the log-on location A. The information $M_\sigma$ is used as private key during the performance and manipulated by means of the number L as follows:

$$T_\sigma = M_\sigma^L \qquad (6)$$

and transmitted (as public key) to A (via a proxy server).

The log-on location had initially calculated the values $T_i$ (cf. equation (5)) and verifies the value transmitted during the Zero-Knowledge method after successful completion of the Zero-Knowledge protocol:

U is authenticated $\Leftrightarrow \exists i \in 0, \ldots, N-2 : T_i = T_\sigma$ If such an i exists, U is an authorized user (i.e. A can be sure that U has a valid certificate and has received correct information from R). Then, A declares this information as invalid, so that there is no multiple log-on with this information and misuse on side of the user (passing on the information to other users) can be excluded. With this step, the requirement (a) for secure authentication is fulfilled, since the log-on location can clearly confirm whether U is an authorized user.

However, for most offers of the provider, a further pair of keys is necessitated. And since A has made the just used key invalid for security reasons, a new pair of keys is necessitated. It would be possible to use the pair that U owns due to the certificate, but then it would be easy to determine the identity of U and anonymous log-on would no longer be possible.

Thus, it should not be possible to get information on U based on the new key. For insuring this, U and A again perform the Zero-Knowledge protocol, so that A does obtain the public key and is convinced that U owns the associated private key, but otherwise receives no further information. The only difference to the above course is that now no pre-determined input is used, but a key randomly selected by U. The same is only to be known to U. In this way, it is possible for A to assign a unique "number" to the user, but so that the number allows no conclusions about the user.

Step A2: The user U and the log-on location A perform again the Zero-Knowledge protocol with a random number as private key. This key is also manipulated again with the same number L.

During the protocol, the log-on location receives the respective public key from U. A stores the same in a common key management of the system for allowing later renewed log-on by U. This means that this key is log-on information that can be reused for later log-ons which are again performed via the Zero-Knowledge proof. Thus, requirement (e) is fulfilled.

Therewith, the authentication protocol is completed and U an authorized user. In summary, it can be said that this protocol allows pseudonymous registration and log-on of a user at a provider and hence fulfils the requirements for pseudonymous authentication. Privacy protection is thereby secured via outplacement of the actual registration and the usage of the above stated mathematical methods.

The requirement for reusability of log-on information is fulfilled in this protocol by additionally generated information, wherein all services of the system have a common key management.

There is also the option to realize requirements (d) and (e) simultaneously and without using a central key management. One reason for this is the general problem of centralization, since when the real identity of the user is uncovered at a service, for example by carelessness of the user or errors in the system, the identity of the user will be known at all services.

The reusable log-on information is only the certificate itself. The user gets issued a certificate at a certification instance with his real identity. With this certificate, the user can log on to several providers. The protocol described herein would in this case not serve for both, registration and log-on, but merely for log-on to different providers.

Thus, the protocol needs revision, e.g. step A2 is no longer necessitated, since the certificate is already the log-on information. It would easily be possible to amend the existing protocol such that it can be used as pure log-on or authentication protocol and still fulfils all requirements as regards to authentication, privacy protection, pseudonymization and reusability of information.

Advantages and Disadvantages:

The advantages are the fulfillment of the relevant requirements, i.e.:

The protocol offers secure authentication (requirement (a))

It protects the privacy of the user (requirement (b)), by using methods like Oblivious Transfer and Zero-Knowledge proofs.

The protocol ensures pseudonymization by the session key allocated with the help of the Zero-Knowledge proof (requirement (c).

The session key is suitable for reuse at other services (requirement (d)).

The disadvantages of the protocol can be delayed computing time or also attack options. These are the following:

A communication channel from A to V exists. The same offers a malicious log-on location possibly the option that A sends manipulated secrets by which information about the user can be found out.

A double application of the Zero-Knowledge method is mathematically more expensive than only one Zero-Knowledge protocol and a PKI, public key infrastructure (see the following protocol).

Authentication Protocol, Variation II

This protocol is identical to the first protocol in large parts. The preparation phases run in the same manner. Also, in a step A2 of the log-on phase, a new pair of keys is generated with the help of Ohta-Okamoto Zero-Knowledge method. With regard to the Oblivious Transfer Method R performs a small intermediate step. R encrypts all secrets $M_0, \ldots, M_{N-1}$ with its own private key, i.e. it signs secrets issued by A before both perform Step R2.

Figure 6A:
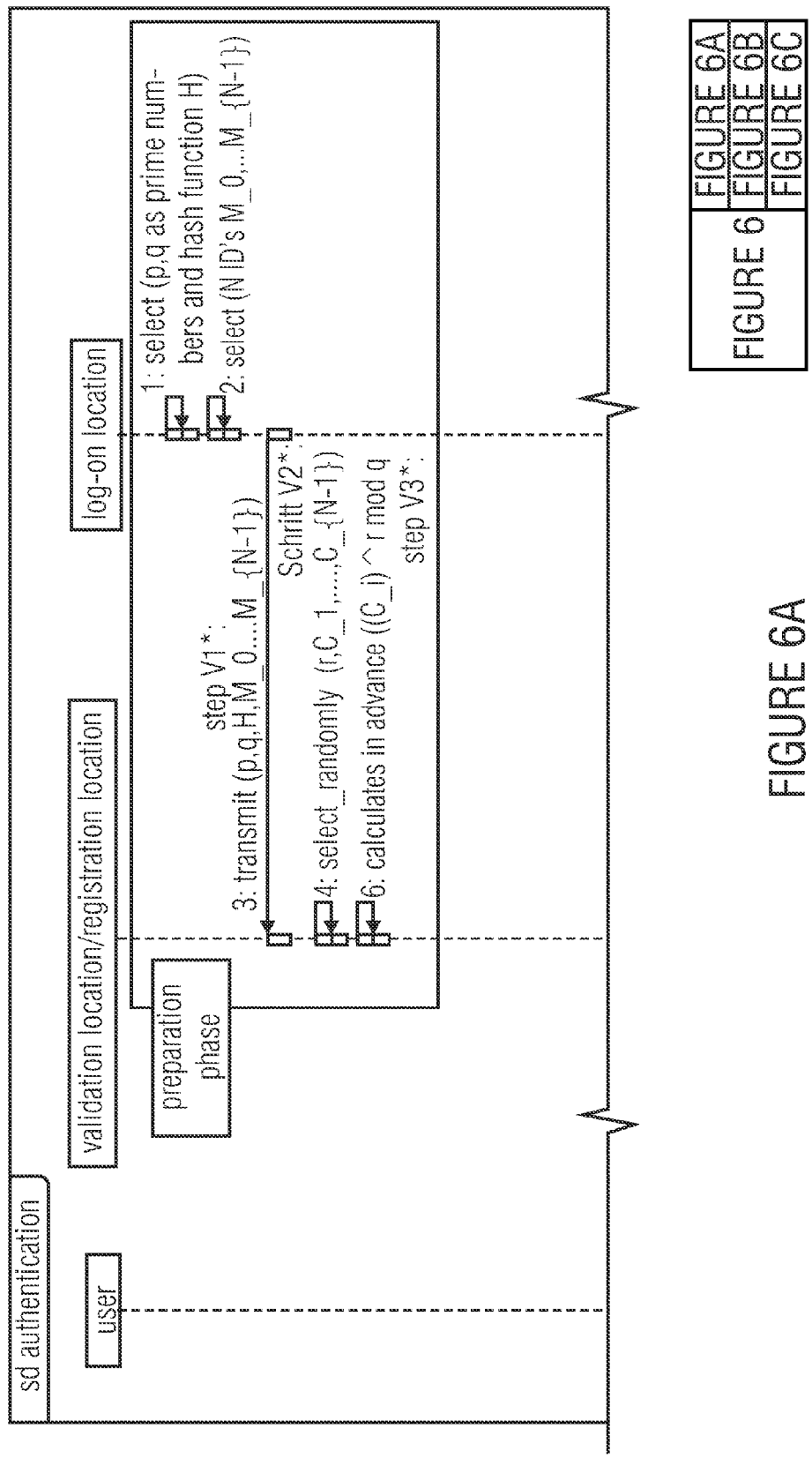
FIG. 6 is a sequence diagram of an authentication protocol (authentication protocol 1 with the "first variation" of the preparation phase, see below) according to an embodiment.
Figure 6C:
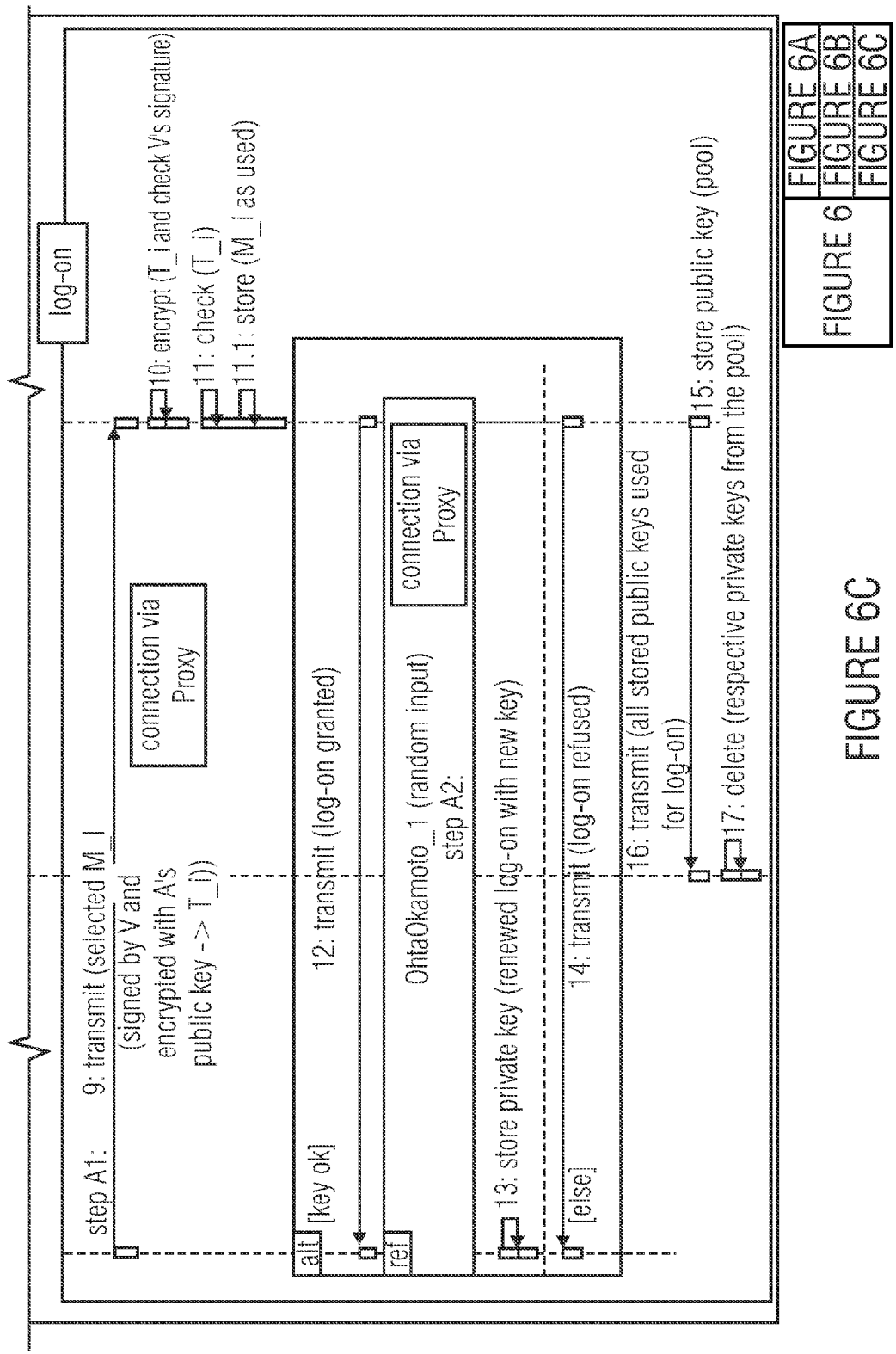

The difference of the two protocols is in step A1 of the log-on phase. In the authentication protocol 1, this step has been performed via a Zero-Knowledge method. In the protocol considered now, this step is performed by means of a standard PKI (public key infrastructure). The protocol is outlined in FIG. 6.

The preparation phase and registration phase are identical to protocol 1. The log-on phase is here realized with a PKI and structured as follows.

Log-on Phase:

For a PKI, a pair of private and public keys is necessitated from every participant. They each serve for encrypting/decrypting and for digitally signing messages. One example for PKI is the RSA cryptosystem (see [RSA78]).

In this protocol, the user wants to send information (a secret), which the user has received from the registration location, to the log-on location. However, it is important that A can verify that the information comes from R himself and has not been generated randomly. For ensuring this, the above-mentioned intermediate step has been introduced, where the registration location signs all information $M_0, \ldots, M_{N-1}$ with its private key. It applies in an asymmetric cryptosystem that a method that has been encrypted with a public key can only be decrypted with the respective private key. But it applies in the same manner that a message encrypted with a private key can only be decrypted with the matching public key. This fact is used here, since everybody can verify whether the $M_i$ come from R, by decrypting the signed $M_i$ with the public key of R. If this results in useful information, it can be ensured that R was the transmitter.

Thus, step A1 is replaced by the following step.

Step A1*: U transmits the information signed by R to A. Thereby, he encrypts the same with the public key from A for providing security for the transmission.

Then, A can verify whether the information really comes from R, since only he is able to transmit legitimate information. Thus, if U has legitimate information, he will be authorized by A to participate in the system.

In the following example, it will be described briefly how the user can proof the ownership of the secret with a PKI.

Example (exemplary proof of identity) $PRK_j, j \in \{U, A, V\}$ is the private key of U, A or R and $PUK_j$ the respectively corresponding public key. Further, $M_i, i=0, \ldots, N-1$ is the information that the registration location has received from the log-on location. Now, R signs this information with the key $PRK_V$ and receives the signed secrets $$M_i':=PRK_V(M_i), i=0,\ldots,N-1. \quad (7)$$

Then, R performs an Oblivious Transfer with the user, wherein U selects the information $M_\sigma'$ there, or during log-on, and receives the same. Now, the user wants to log on to A with this information. For this, U applies the public key of A ($PUK_A$) to his information:

$$M_\sigma'':=PUK_A(M_\sigma'). \quad (8)$$

The user transmits this value to the log-on location. The same first uses its private key $PRK_A$ for decrypting the message:

$$PRK_A(M_\sigma'')=M_\sigma'. \quad (9)$$

This then corresponds to the secrets signed by R. Now, A only has to verify the signature of R by decrypting this value with V's public key $PUK_V$ $$PUK_V(M_\sigma')=M_\sigma. \quad (10)$$

Thus, the log-on location has received information that it can verify and by which the user is authenticated.

After authenticating the user, like in the other two protocols, a new pair of keys is necessitated, which the user generates as randomly as possible. This means step A2 of protocol 1 is also maintained.

This protocol has a larger difference to the one above which provides advantages, but also disadvantages.

Advantages:
Requirements (a) to (d) are fulfilled.
The usage of a public key infrastructure makes the protocol faster and also ensures sufficient security.
Simple application in practice since numerous implementations exist.

Disadvantages:
A disadvantage is again the communication of A with V, i.e. it would again be possible that A constructs manipulated secrets and hence allows an attack.
The usage of the PKI does not offer the strong privacy protection which ZK offers.

Conclusion for I+II

The described methods allow respective authentication of users and the data generated by them with simultaneous privacy protection even when other protagonists have an interest in misusing the user data. Thus, they present possible basic methods for many cases of application.

In alternative embodiments, the protocol is amended at different locations. However, all amendments involve disadvantages, either lower cryptographical security or weaker data protection.

Alternative Registration Information

It would be possible to use other information than a qualified certificate for verifying the identity of the user. However, the description of the protocol provides for all suitable SOTA methods.

Alternative Credential Transmission

The usage of an alternative method for transmitting the credentials with simultaneously ensuring the separation between pseudonym and real identity would change the protocol.

Alternative Log-on Methods

Both for the first and for the renewed log-on another method than PKCS or ZK could be used. For this, as mentioned above, all SOTA key exchange methods, such as the Diffie-Hellman key exchange can be considered.

Alternative Protocol Structure

It would further be possible to amend the protocols in that the order of all above-stated mandatory and optional components is changed. However, this would only be a permutation of the original protocol when using the intended SOTA technology, which provides the same result and would thus be no new invention.

In the future, it would be possible to increase the security of the protocol further by performing communication during registration and log-on not via an anonymization service, but via secure quantum channels, where checking for a potential eavesdropper is possible.

Application Example

"Revenue Sharing Based on Limited Voting"

In the following, a specific case of application, the so-called Revenue Sharing is described and developed, which necessitates an authentication by the above protocol and is based on its pseudonymization for being able to differentiate between users and hence being able to allocate actions to individual IDs or pseudonyms. Insofar, this application case serves for verifying the functionality of the above described protocol.

A problem in the field of legal distribution systems is the just distribution of an existing financial contingent between artists. Normally, this is only possible by violating the privacy or by using DRM. In the described case of application, this is to be realized in a different manner: in a closed network (e.g. P2P), users have the option to download content provided by artists (or providers), on the other hand, users should also be able to evaluate the content with a limited number of votes. A given revenue is then to be distributed among the authors of the content based on the votes. However, the artists should have no option to find out which user has voted for which content, also, for the system itself, it should be impossible to draw conclusions on the real identities of the users. On the other hand, the user should not be able to find out which artists have received how many votes and for which content, since payment to the artists takes place, which is coupled to the votes allocated to him. Above that, there are to be specific types of competitions or campaigns where the users can perform evaluations separate to their actual votes. These campaign votes are limited in time and have to be counted separately.

Realization: For participating in the system, the users have to register first based on the above-described protocols. The further steps (cf. FIG. 7):

1. Log-on of the user to a service (protagonists: log-on location, user)
2. Download of content by the user (protagonists: distribution System, user): The users fetch the desired content of the artists from the distribution system (e.g. P2P System). Here, every content of the artist has been provided in advance with a unique content ID by the payment location, optionally additionally with a competition ID for the case that several votings/competitions are to be performed in the system.
3. Casting votes (protagonists: evaluation location, user): The user transmits the content ID of the content favoured by him, signed with the private key generated in step 3, to an evaluation location. Transmission should be secured via PKC for avoiding information gain for third parties from intercepted messages or conclusions on the identity of the user (via IP addresses). The evaluation location now verifies the number of cast votes of the user. This is only possible since every user has a unique pseudonym with the help of which the system can differentiate between users. The user can (optionally) also transmit the signed competition IDs to the evaluation location. Here, the cast votes are not incorporated in the original contingent, since the limitation is determined and verified separately for each competition.
4. Counting the votes and payment to the artists (protagonists: revenue location, artists): After the evaluation location has sent the number of all votes cast for each content ID to the revenue location, the same performs allocation of the content IDs to the artists. Thereby, the revenue location adds up all votes cast for each artist. Now, each artist receives a respective portion of the financial contingent corresponding to the votes cast for him. If several competitions exist, these are differentiated via the competition ID and considered correspondingly for the revenue.

Protocol Revenue Sharing

In the following, a protocol for the application case of Revenue Sharing will be developed. Here, it is described how a given revenue is distributed among the authors of content via votings of users.

Figure 7A:
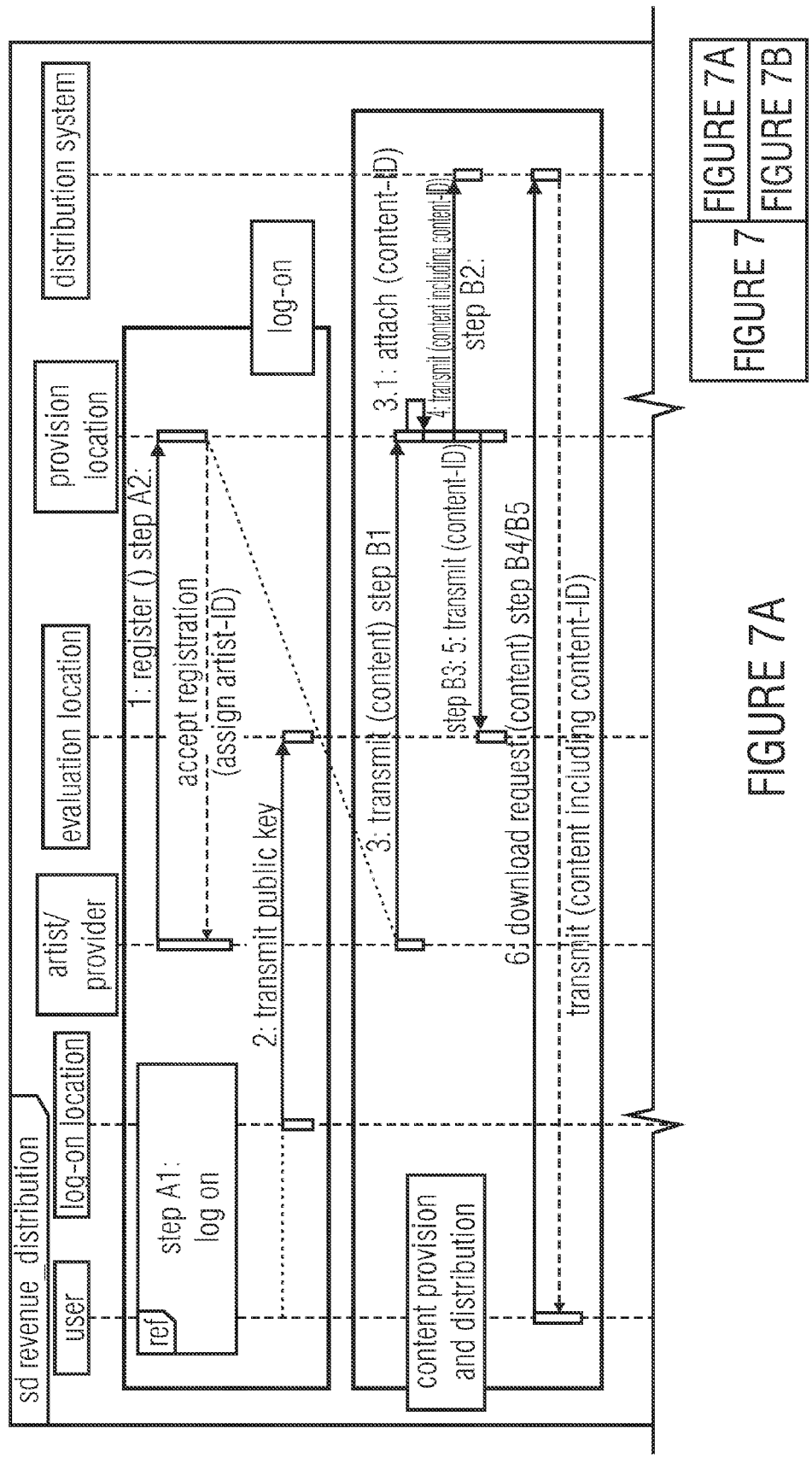
FIG. 7 is a sequence diagram regarding the so-called revenue sharing according to an embodiment.
Figure 7B:
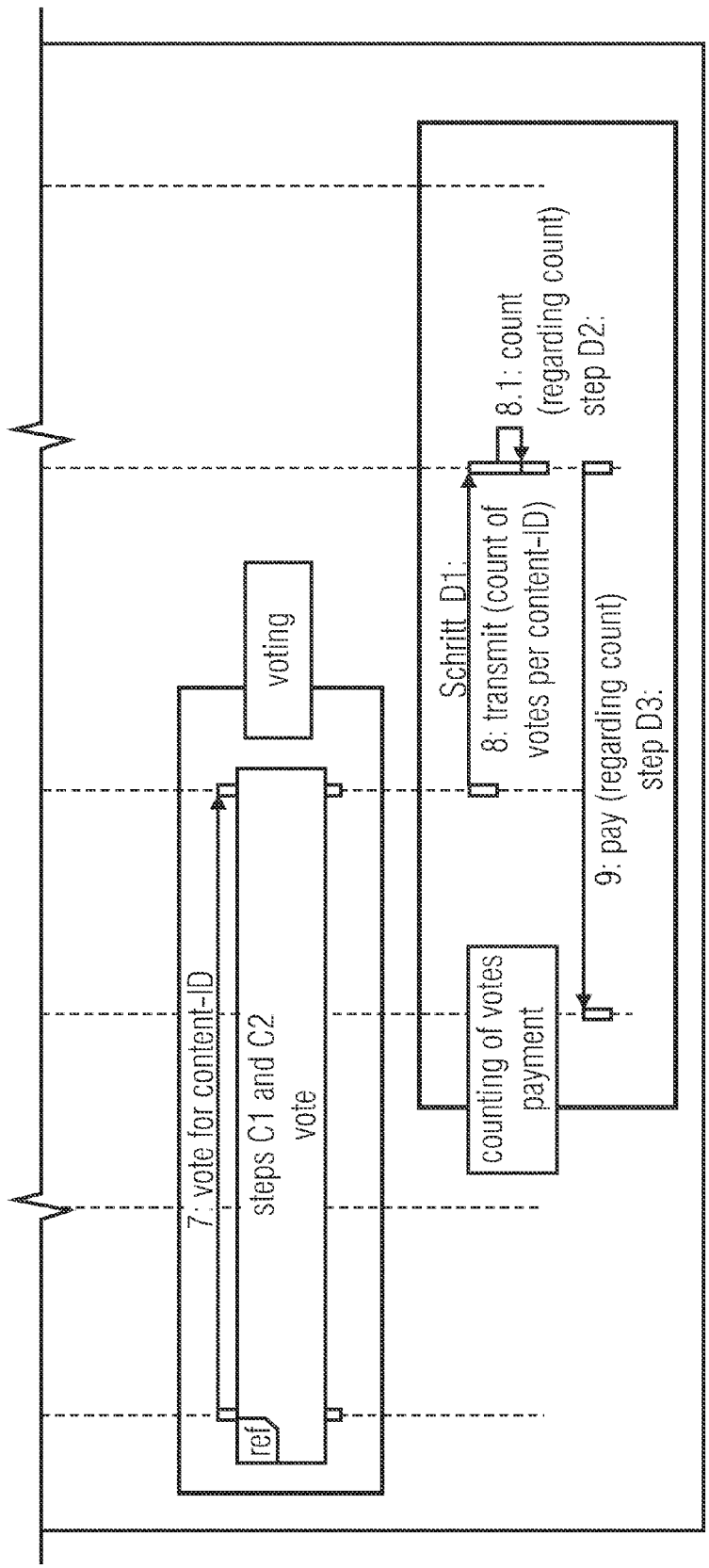
Figure 7B:
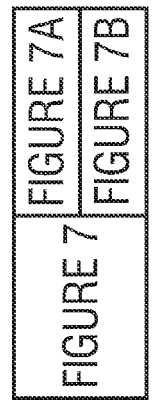

The protocol for revenue sharing is outlined in FIG. 7. As can be seen, the system is divided into several instances, each performing different tasks. This is necessitated since it ensures the anonymity or pseudonymity of the user. In this protocol, the system consists of a log-on location, an evaluation location, a payment location and a distribution system. Log-on to the system is performed at the log-on location. The evaluation location is responsible for registering and counting the votes cast by the user. The distribution system distributes the registered content and allows voting. The payment location is responsible for registering the artists or providers and for providing their content to the distribution system. Also, the payment location performs payment to the artists or providers, corresponding to the voting.

The protocol can be divided into four phases. It starts with Phase A, the log-on. Followed by content provision and distribution (Phase B) and voting (Phase C). The last phase is formed by counting the votes and payment.

Log-on:

The protocol starts with the log-on of the user to the system.

Step A1: The user logs on to the log-on location with the key he has received in step A2 of the authentication protocol. The key should be safeguarded against interception by asymmetric encryption.

This key also has to be used in every further log-on and serves as some type of password since it is unique for every user. Based on this password, the system can obtain no information on the user and can allocate no user information to the password, since the authentication protocol has been exactly designed for this. It is important that the same password is used for every log-on, since the vote limitation is controlled via the respective user key. Apart from the log-on of the users, the artists wanting to provide content have to log on as well. The difference is that they can log on via a common method. However, it is possible that the artists want to use different content, then they have to log on separately as user.

Step A2: The artists log on to the system.

Content Provision and Distribution:

As has already been mentioned, artists and providers want to provide any content that can be downloaded and evaluated by the users.

First, an artist or provider has to provide content for the system. This takes place in the following way:

Step B1: The provider sends his content to the payment location providing the content with an identification number (ID).

This ID has to be clearly allocatable to the provider. Thereby, different types of allocation are possible. For example, every artist can be allocated one or several—but a very limited number—of IDs. With a single ID, there is the disadvantage that the evaluation location can compile statistics per artist/provider based on votes for the IDs, and can hence draw conclusions on the current popularity of different artists. Another option is that every content receives its own ID, which has the advantage that the evaluation location can later not compile statistics about individual content for every artist based on the IDs since it does not know allocations of identification numbers and artists.

Then, content has to be distributed. Therefore, the following step is performed:

Step B2: The payment location transmits the content, including the respective ID, to the distribution system.

For counting the votes, the evaluation location necessitates all identification numbers:

Step B3: The payment location transmits all identification numbers to the evaluation location.

Thereby, the distribution system can provide the content for the users and the next step follows:

Step B4: The users download the desired content and receive the respective content ID for every content.

Thus, the user is able to cast a vote for a specific content with the help of the ID if he wants to do so.

The provision of contents for the competitions or campaigns is performed in a similar manner. The content is provided as just described, but it is necessitated here to associate an individual campaign ID to every competition and publish a list of the participating contents.

Step B5: The users download specific competition contents, including the associated campaign ID.

Based on the campaign ID, every user can cast votes for specific competitions, which can then also be counted separately.

The steps in this phase are not limited to a specific order, as long as at least one content is already available. Depending on the limitation of the votes, they can be repeated as often as desired.

Figure 8:
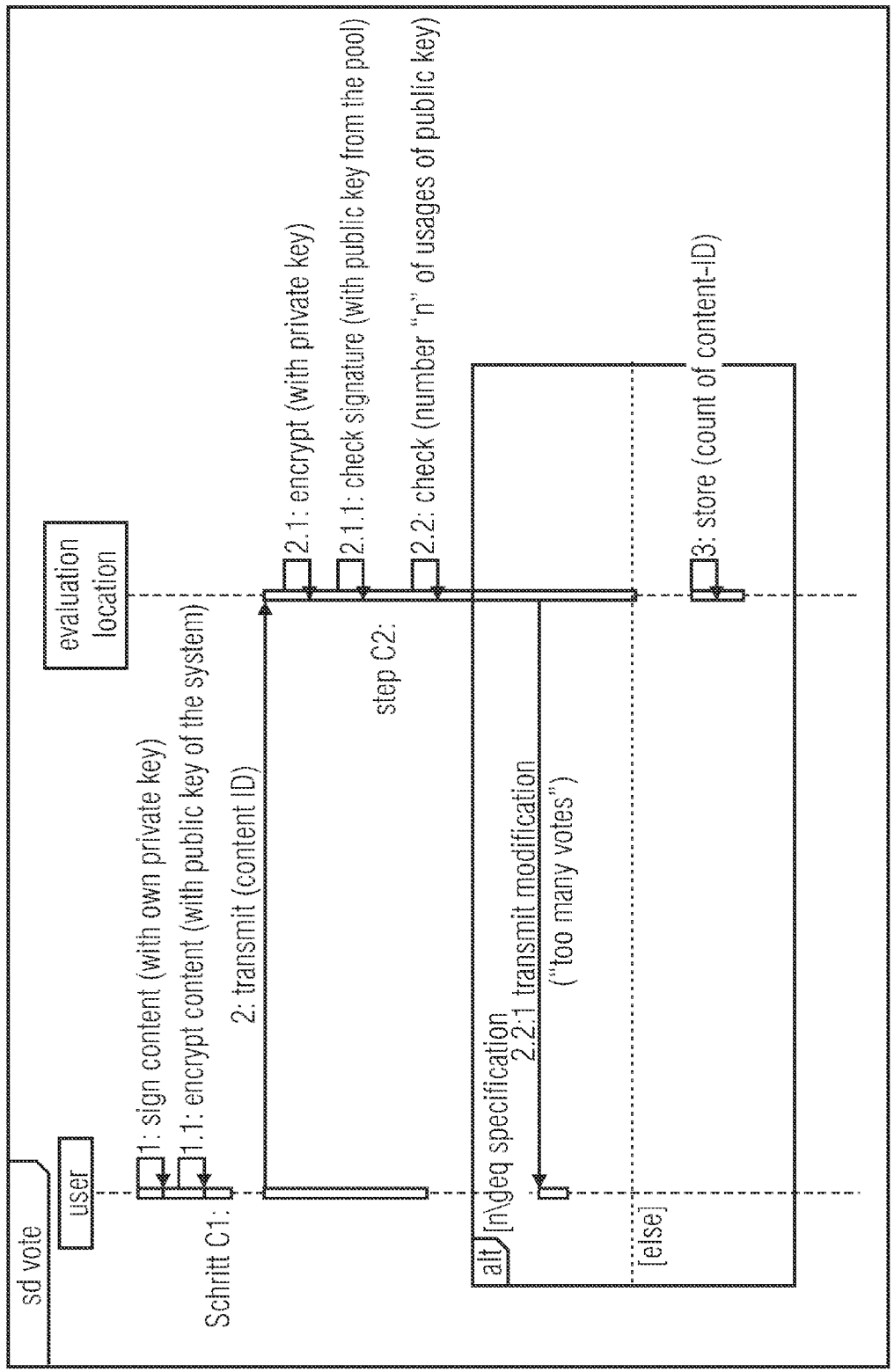
FIG. 8 is a sequence diagram of the voting for revenue sharing according to an embodiment.

Voting:

If a user has decided to cast a vote, he does so by means of the obtained content ID and optionally by means of the campaign ID (cf. FIG. 8).

Step C1: The user signs the IDs with his private key and encrypts them with the public key of the evaluation location and then transmits the ID to the evaluation location.

Here, the private key is again the private key to the password that has been used for log-on. If it is a different key (for example from a certificate or the like) the cast vote will not be accepted.

For verifying the vote, the evaluation location has to perform the next step:

Step C2: The evaluation location compares the user signature with the respective stored public keys of the users.

If the used key is included in the pool, the evaluation location verifies how often this key has already been used for normal voting or voting in a competition. If the number is within the limit given by the system, the vote is accepted. Thereby, the evaluation location registers the respective transmitted content ID and possibly the campaign ID and stores the number of the all votes for this ID.

The steps of this phase a tied to this order and can be repeated as long as the user has not reached the vote limit.

Counting of Votes and Payment:

After a certain time (in campaigns after their termination) the votes have to be counted. For this purpose, the evaluation location performs the following step:

Step D1: The evaluation location sends all IDs and the number of votes for the same to the payment location.

The same then performs the counting.

Step D2: The payment location assigns the votes to the artists, providers and campaigns.

As mentioned above, the payment location counts all votes for an artist or provider and thus obtains a statistic as to which artist and which provider has received how many votes.

According to this statistic, every artist and every provider receives a portion of a monetary stock.

Step D3: The payment location pays artists and providers according to the cast votes.

Obviously, slightly amended scenarios are also possible, for example that artists receive no payment via the number of votes, but based on general popularity. For this purpose, voting would have to be amended and every vote to be designed in several stages. This means, the voting includes additional information as to how much a user liked the respective content.

Advantages and Disadvantages:

Advantages:

Decentralization of individual services offers ample anonymity of the users and the artists or providers. Thus, the system is not easily able to compile user statistics and, if so, the same can at least not be allocated to a specific user.

Log-on via a Zero-Knowledge Protocol is anonymous (or pseudonymous).

The usage of the same log-on key for every user offers the system the security to authenticate an authorized user at every log-on as well as to monitor limitation of the campaigns. Thereby, the user has the advantage of not having to generate a new key for every log-on.

Disadvantages:

The usage of only one key per user gives the evaluation location the option of compiling statistics about the user even if it does not know which user it is and to whom his preferences apply.

Also, when the individual services of the system cooperate in a malevolent manner, it is possible to compile statistics for the individual contents, respective artists or providers. However, due to the anonymous log-on, the same cannot be allocated to a user. For this reason, technical security measures should be taken for making such a cooperation more difficult.

If communication is not performed via an anonymization service, in some cases conclusions on the user become possible.

Presentation of a Possible Oblivious Transfer protocol

Oblivious Transfer protocols (OT) allow a party, the transmitter, to transmit part of his given information to another party, the receiver, and this in a manner protecting both: for the transmitter, it is ensured that the receiver does not receive more information than he is authorized to receive. At the same time, it is ensured for the receiver that the transmitter does not find out which part he has received. Oblivious Transfer is a decisive component in many cryptography applications. However, it is very expensive regarding computing effort and can frequently be the bottleneck in many applications.

Figure 10A:
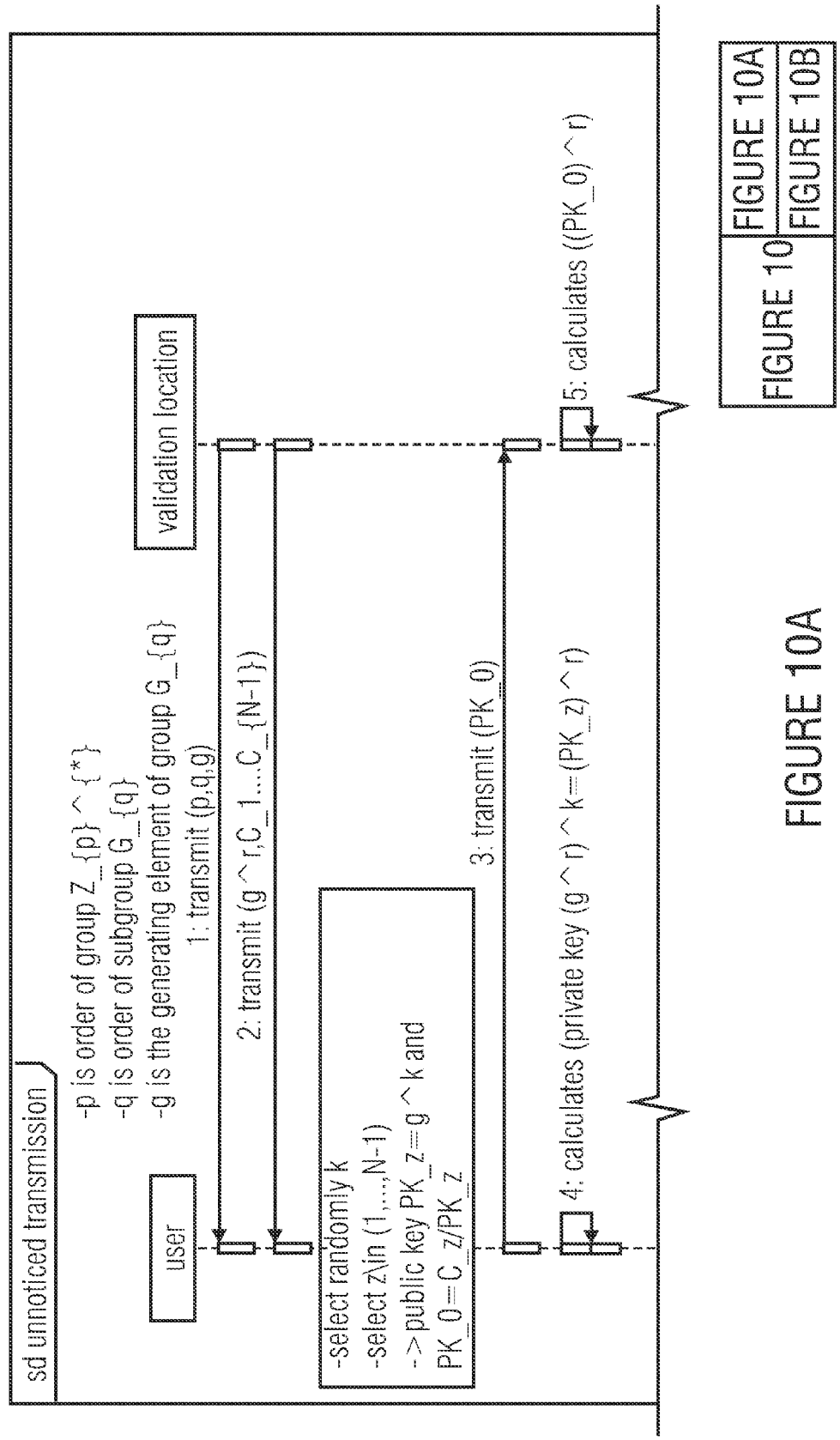
FIG. 10 is a sequence diagram of an Oblivious Transfer Protocol according to an embodiment.
Figure 10B:
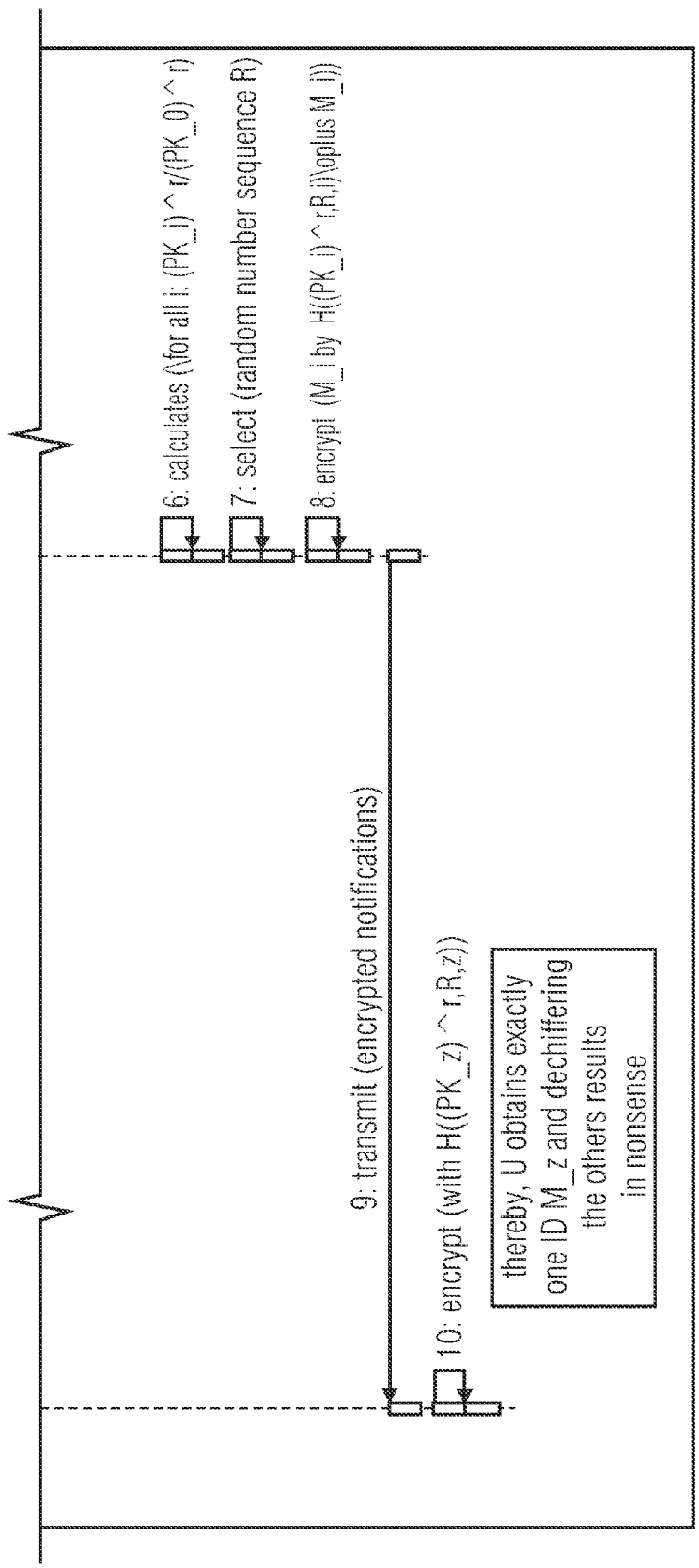
Figure 10:
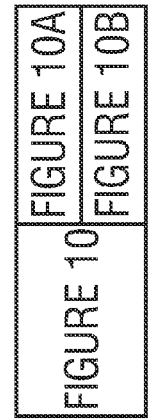

There are different options for designing an OT protocol as used in the above embodiments. Frequently, the random oracle model is used, or, as in [NP01], the Diffie-Hellman Assumption regarding computability and regarding decidability, which will now be briefly described, wherein reference is made to FIG. 10 showing an OT protocol possible for the above embodiments.

Assumptions and Models

The security analysis of the protocols is based on the Diffie-Hellman Assumption, on the one hand in the sense of computability theory and on the other hand in the sense of a decision problem and the "random oracle" model.

Diffie-Hellman Assumption (DHA)

We assume that we have a probabilistic method for generating the group $Z_q$ and the generator g.

Definition (Computability DHA) The computability-theoretical version of the assumption says that every probabilistic polynomial time machine at given $$g^a, g^b \in Z_q \quad (23)$$

has only one negligible probability of calculating $g^{ab}$ correctly. Wherein the probability depends on the group and g as well as the selection of $g^a$ and $g^b$. [Sho97] shows different boosting algorithms.

Definition (Decidability DHA) The decidability version says that it is difficult to differentiate between $$(g^a, g^b, g^{ab}) \text{ und } (g^a, g^b, g^c), \quad (24)$$

wherein a, b, c are selected randomly.

"'Random Oracle'" Model

Definition (Model of random oracle) Several of the Oblivious Transfer protocols stated herein use a function H referred to as random oracle in the analysis. A random oracle is a model of an ideal cryptographic hash function. Ideal means here that the hash value can only be determined with the help of the random oracle. This holds also true when several other pairs of inputs and hash values of the oracle are known. Still, the oracle returns the same hash value for one and the same input ([BR93]). The function H is selected as a real random function and is accessible for every participant (of course, H is implemented in the application itself as a hash function, like SHA-1). The security is based on the fact that an attacker can only evaluate a limited number of values of the function in a limited time.

Protocol

Naor/Pinkas' $OT_1^N$ Protocol

The following protocol has been presented in [NP01]. This protocol can be used in the above embodiments.

Definition ($OT_1^N$ Protocol)

Given are: Two large prime numbers p and q with q|(p−1) for operating on the groups $(Z_p, \cdot)$ and a sub group $(G_p, \cdot)$ of the order q and the generating element g (i.e. the group $(G_p, \cdot)$ consists of powers of g modulo q). The point operations used below are to be assumed in the group modulo p. Further, a hash function H is given as random oracle (see random oracle model [CGH98]).

Initialization: The transmitter, in our case the registration location V, selects uniformly distributed random numbers $$r \in Z_q, C_1, \ldots, C_{N-1} \in Z_q.$$

For the public key $PK_i$ $$PK_0 \cdot PK_i = C_i.$$

is to apply later.

The values $g^r$ and $C_1, \ldots, C_{N-1}$ are published. R then calculates $$(C_i)^r \bmod q, \text{für } 1 \leq i \leq N-1.$$

Transfer: R has as input its N secrets $M_0, \ldots, M_{N-1}$ and the input of U is an index $\sigma \in \{0, \ldots, N-1\}$ for selecting the desired secret $M_\sigma$. The receiver, here again the user U, selects a random number k and calculates the public key $$PK_\sigma = g^k \text{ und} \quad (28)$$

$$PK_0 = C_\sigma \cdot (PK_\sigma) \quad (29)$$

U sends $PK_0$ to R and calculates for decrypting $$(g^r)^k = (PK_\sigma)^r. \quad (30)$$

V calculates $(PK_0)^r$ and for every i:

$$(PK_i)^r = (C_i)^r \cdot ((PK_0)^r)^{-1}.$$

V selects a random string R (in order to not to send data twice in the case of several versions of the protocol) and encrypts all $M_i$ by $$H((PK_i)^r, R, i) \oplus M_i \quad (31)$$

and transmits the ciphers and R to U. U itself can then use $$H((PK_\sigma)^r, R, \sigma) \quad (32)$$

for decrypting $M_\sigma$. A sequence diagram of the protocol can be seen in FIG. 10.

Remark (efficiency) Exponentiating is considered to be the most expensive operation. For this protocol, two exponentiations are necessitated on the side of the receiver and O(N) at the transmitter. When needed, a protocol can be constructed necessitating, for a self-selected parameter K only $$\frac{\log N}{\log K}$$

exponentiations at the receiver and $$2 \frac{\log N}{\log K}$$

by the transmitter (see [NP01]).

There is the option to reduce an $OT_1^{2^l}$ to l versions of $OT_1^2$ or vice versa for saving computing time at the expense of communication time or vice versa. Thereby, it should be possible to convert private information retrieval into symmetric private information retrieval protocols (i.e. not only the privacy of the receiver is ensured, but also the transmitter is protected from the receiver receiving too much information) without increasing the number of rounds.

[NP01] also shows a suggestion for replacing the random oracle H by selecting an El Gamal-based encryption.

It is decisive in $OT_1^N$ that U receives exactly one of the N pieces of information provided by the log-on location A and cannot receive any knowledge about the other information. Apart from that, due to the encryption with the private and public keys within $OT_1^N$ V is not able to find out which information U has selected. Thereby, it is ensured that A cannot query R as to which user belongs to a specific key, since R does not know this either. Since this is information generated by A, A can decide whether a user has been authorized by R. Apart from that, A has no possibility of finding out anything about U.

Remark (computing effort) The initialization consists of N exponentiations from the transmitter. After initialization, the transmitter performs only a single exponentiation in every transfer, in addition to N−1 multiplications and N calls of H.

The receiver can pre-calculate the key for decrypting before he receives the encrypted elements from the transmitter.

The communication effort from the transmitter to the receiver is of the size of N strings.

Implementation of the embodiments: Depending on specific implementation requirements, embodiments of the invention can be implemented in hardware or in software. The implementation can be performed by using a digital memory medium, for example a floppy disc, a DVD, a Blu-ray disc, a CD, an ROM, a PROM, an EPROM, an EEPROM or a FLASH memory, a hard drive or any other magnetic or optical memory on which electronically readable control signals are stored that can cooperate or cooperate with a programmable computer system such that the method is performed. Thus, the digital memory medium can be computer-readable.

Thus, some embodiments according to the invention comprise a data carrier comprising electronically readable control signals that are able to cooperate with a programmable computer system such that one of the methods described herein is performed.

Generally, embodiments of the present invention can be implemented as a computer program product with a program code, wherein the program code is effective for performing a method when the computer program product runs on a computer.

For example, the program code can also be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein, when the computer program runs on a computer.

A further embodiment of the inventive method is hence a data carrier (or a digital memory medium or a computer-readable medium) on which the computer program for performing one of the methods described herein is recorded.

Thus, a further embodiment of the inventive method is a data stream or a sequence of signals representing the computer program for performing one of the methods described herein. The data stream or the sequence of signals can be configured to be transferred via a data communication connection, for example via the internet.

A further embodiment comprises a processing means, for example a computer or a programmable logic device configured or adapted to perform one of the methods described herein.

A further embodiment comprises a computer on which the computer program for performing one of the methods described herein is installed.

In some embodiments, a programmable logic device (for example a field-programmable gate array, an FPGA) can be used to perform some or all functionalities of the methods described herein. In some embodiments, a field-programmable gate array can cooperate with a microprocessor for performing one of the methods described herein. Generally, the methods in some embodiments are performed by any hardware device. This can be universally usable hardware such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[Aug95] Gavin Lowe August. An attack on the needham-schroeder public-key authentication protocol. *Information Processing Letters*, 56:131-133, 1995.

[BAN89] M. Burrows, M. Abadi, and R. M. Needham. A logical of authentification. *Proceeding of the Royal Society of London*, 426:233-271, 1989.

[BM90] M. Bellare and S. Micali. Non-interactive oblivious transfer and applications. *Proc. Adv. in Cryptology—Crypto '89*, LNCS 435:547-557, 1990.

[BR93] Mihir Bellare and Philip Rogaway. Random oracles are practical: A paradigm for designing e_cient protocols. Proceedings of the 1st ACM Conference on *Computer and Communications Security*, pages 62-73, November 1993.

[BSW06] Albrecht Beutelspacher, Jörg Schwenk, and Klaus-Dieter Wolfenstetter. *Moderne Verfahren der Kryptographie*. Vieweg Wiesbaden, 2006.

[CGH98] R. Canetti, O. Goldreich, and S. Halevi. The random oracle methodology. *Proc. 30th ACM Symposium on Theory of Computing*, 30:209-218, 1998.

[Eck01] C. Eckert. IT-Sicherheit (*Konzept-Verfahren-Protokolle*). Oldenbourg Verlag Munchen Wien, 2001.

[ElG85] T. ElGamal. A public key cryptosystem and a signature scheme based on diskrete logarithms. *IEEE Trans. on Information Theory*, IT-31:469-472, 1985.

[FS86] A. Fiat and A. Shamir. How to proof yourself: Practical solutions to identification and signature problems. *CRYPTO '86*, LNCS 263:186-194, 1986.

[HFPS99] R. Housley, W. Ford, W. Polk, and D. Solo. Internet x.509 public key infrastructure certificate and crl profil. RFC, 2459, 1999.

[IM90] C. I'Anson and C. Mitchell. Security defects ccitt recommendation x.509—the directory authentication framework. *Computer Communications Review*, 20(2):30-34, 1990.

[Low95] Gavin Lowe. An attack on the needham-schroeder public-key authentication protocol. *Information Processing Letters*, 56:131-133, 1995.

[Lys07] Anna Lysyanskaya. Authentication without identification. *Security & Privacy*, IEEE, 5-3:69-71, 2007.

[NP01] Moni Naor and Benny Pinkas. E_cient oblivious transfer protocols. *Proceedings of the twelfth annual ACM-SIAM symposium on Discrete algorithms*, 12:448-457, 2001.

[NS78] Roger Needham and Michael Schroeder. Using encryption for authentication on large networks of computers. *Communications of the ACM*, 21(12):993-999, December 1978.

[OO88] Kazuo Ohta and Tatsuaki Okamoto. A modification of the fiat-shamir scheme. *Lecture Notes in Computer Science*, 403:232-243, 1988.

[PKI] http://www.packtpub.com/article/public-key-infrastructure-pki-otherconcepts-cryptography-cissp.

[PXY] http://www.uni-duesseldorf.de/Proxy/Artikel.shtml.

[RSA78] R. L. Rivest, A. Shamir, and L. Adleman. A method for obtaining digital signatures and public key cryptosystems. *Communications of the ACM*, 21(2):120-126, February 1978.

[Sho97] V. Shoup. Lower bounds for discrete logarithms and related problems. *Proc. Eurocrypt '97*, LNCS 1233:256-266, 1997.

[TOR] http://www.torproject.org/index.html.de.

The invention claimed is:

1. A system for pseudonymized authentication of user entities, comprising:
a registration location implemented to verify a proof of identity of a user entity and, if the proof of identity of the user entity is successfully verified, to select a pseudonym token out of a subset of unused pseudonym tokens of a set of pseudonym tokens and to issue the selected pseudonym token to the user entity, and
a log-on location implemented to perform, with the user entity, an authentication process to authenticate the user entity based on the pseudonym token and, in response to the authentication process of the user entity, to mark the pseudonym token as used, such that the subset of unused pseudonym tokens is reduced by the pseudonym token; wherein the registration location is implemented to select and issue the pseudonym token according to an Oblivious Transfer protocol so that any association between the identity of the user and the selected pseudonym token is unknown to the registration location, the log-on location is implemented to verify, within the authentication process of the user entity based on the pseudonym token, whether the pseudonym token belongs to the subset of unused pseudonym tokens of the set of pseudonym tokens, the log-on location is implemented to not complete the authentication process if the result of the verification is that the pseudonym token does not belong to the subset of unused pseudonym tokens, the log-on location is implemented to complete the authentication process if the result of the verification is that the pseudonym token belongs to the subset of unused pseudonym tokens, so that the subset of unused pseudonym tokens is reduced by the pseudonym token, during a next verification, selection, and issuance of a further pseudonym token with respect to another user and according to the Oblivious Transfer protocol, the registration location is implemented to select the further pseudonym token from the reduced subset of unused pseudonym tokens of the set of pseudonym tokens so that any association between an identity of the another user and the selected further pseudonym token is unknown to the registration location, a computer is programmed to implement the registration location, and at least one computer or a computer network is programmed to implement the log-on location; and the log-on location is implemented to, in order to complete the authentication process, agree with the user entity on access data for future log-on processes.

2. Registration location for selecting a pseudonym token for a user entity, wherein:

the registration location is implemented to verify a proof of identity of the user entity, the registration location is implemented to select, if the proof of identity of the user entity is successfully verified, a pseudonym token of a subset of unused pseudonym tokens of a set of pseudonym tokens and to issue the selected pseudonym token to the user entity, the registration location is implemented to select and issue the pseudonym token according to an Oblivious Transfer protocol so that any association between the identity of the user and the selected pseudonym token is unknown to the registration location, the registration location is implemented to receive a used pseudonym token from a log-on location, to reduce the subset of unused pseudonym tokens the used pseudonym token in response to receiving the used pseudonym token, and, during a next verification, selection, and issuance of a further pseudonym token with respect to another user and according to the Oblivious Transfer protocol, to select the further pseudonym token from the reduced subset of unused pseudonym tokens of the set of pseudonym tokens so that any association between an identity of the another user and the selected further pseudonym token is unknown to the registration location, and a computer is programmed to implement the registration location.

3. Registration location according to claim 2, implemented such that the verification of the proof of identity comprises performing cryptographic protocols, wherein the user entity authenticates itself at the registration location using an electronic circuit that is uniquely allocated to the user entity.

4. Registration location according to claim 2, wherein:

the registration location is implemented to verify the proof of identity by verifying whether the user entity belongs to the plurality of authorized user entities stored in a user database, in which case the verification of the proof of identity is successful, the user database stores clearly differentiable entries for a plurality of authorized user entities, and if the registration location determines that the user entity does not belong to the plurality of authorized user entities, the verification of the proof of identity is unsuccessful.

5. Registration location according to claim 2, wherein the registration location is implemented to acquire the set of pseudonym tokens from a log-on location via a firewall.

6. Registration location according to claim 2, wherein the registration location is implemented to generate the set of pseudonym tokens in response to a request of a log-on location and to transmit them to the log-on location via a firewall.

7. Registration location according to claim 6, wherein the registration location is implemented to provide, when generating the set of pseudonym tokens, the plurality of pseudonym tokens individually with a respective signature of the registration location, so that the pseudonym tokens can be verified by the log-on location.

8. Registration location according to claim 6, wherein the registration location is implemented to submit, in response to a request of the log-on location, a pseudonym token comprised in the request to a verification of authenticity, and to respond to the log-on location according to the result of the verification of authenticity.

9. A log-on location, wherein:

the log-on location is implemented to either generate a set of pseudonym tokens suitable for an Oblivious Transfer protocol and pass them on to a registration location or to request and receive the set of pseudonym tokens from the registration location, the log-on location is implemented to verify, within an authentication process of a user entity based on a pseudonym token, whether the pseudonym token belongs to a subset of unused pseudonym tokens of the set of pseudonym tokens, the log-on location is implemented to not complete the authentication process if the result of the verification is that the pseudonym token does not belong to the subset of unused pseudonym tokens, the log-on location is implemented to complete the authentication process and to mark the pseudonym token as used if the result of the verification is that the pseudonym token belongs to the subset of unused pseudonym tokens, so that the subset of unused pseudonym tokens of the plurality of pseudonym tokens is reduced by the pseudonym token, at least one computer or a computer network is programmed to implement the log-on location, and the log-on location is implemented to, in order to complete the authentication process, agree with the user entity on access data for future log-on processes.

10. Log-on location according to claim 9, wherein the log-on location is implemented to verify, according to a Zero- Knowledge Protocol, whether the pseudonym token belongs to the subset of unused pseudonym tokens of the set of pseudonym tokens.

11. Log-on location according to claim 9, wherein:
the set of pseudonym tokens are individually provided with a respective signature of the registration location,
the log-on location is implemented to verify the pseudonym token within the authentication process as to whether the pseudonym token is provided with the respective signature of the registration location, and
the log-on location is implemented to not complete the authentication process if the pseudonym token is not provided with the respective signature of the registration location.

12. Log-on location according to claim 9, wherein:
the log-on location is implemented to request the registration location within the authentication process to submit the pseudonym token to a verification of authenticity, and
the log-on location is implemented to not complete the authentication process if a response received by the registration location according to a result of the verification of authenticity shows that the pseudonym token is not genuine.

13. A log-on location according to claim 9, wherein:
the log-on location comprises at least one of a proxy and a firewall, and
the log-on location is implemented to pass the set of pseudonym tokens on to the registration location via the at least one of a proxy and a firewall.

14. Method for pseudonymized authentication of user entities, comprising:
verifying, in a registration location, a proof of identity of a user entity,
selecting, in the registration location, a pseudonym token out of a subset of unused pseudonym tokens of a set of pseudonym tokens and issuing the selected pseudonym token to the user entity,
performing, in a log-on location and with the user entity, an authentication process of the user entity based on the pseudonym token,
marking, in the log-on location and in response to the authentication process of the user entity with the pseudonym token, the pseudonym token as used, so that the subset of unused pseudonym tokens is reduced by the pseudonym token,
agreeing, in the log-on location and with the user entity, on access data for future log-on processes in order to complete the authentication process, and
verifying, by the authentication process of the user entity based on the pseudonym token, whether the pseudonym token belongs to the subset of unused pseudonym tokens of the set of pseudonym tokens, wherein
the pseudonym token is selected and issued according to an Oblivious Transfer protocol so that any association between the identity of the user and the selected pseudonym token is unknown to the registration location,
if the result of the step of verifying is that the pseudonym token does not belong to the subset of unused pseudonym tokens, the authentication process is not completed,
if the result of the step of verifying is that the pseudonym token belongs to the subset of unused pseudonym tokens, the authentication process is completed and the pseudonym token is marked as used,
during a next verification, selection, and issuance in the registration location of a further pseudonym token with respect to another user according to the Oblivious Transfer protocol, the further pseudonym token is selected from the reduced subset of unused pseudonym tokens of the set of pseudonym tokens so that any association between an identity of the another user and the selected further pseudonym token is unknown to the registration location,
a computer is programmed to implement the registration location, and at least one computer or a computer network is programmed to implement the log-on location.

15. Method for selecting, from a registration location, a pseudonym token for a user entity, comprising:
verifying a proof of identity of the user entity,
selecting, if the proof of identity of the user entity is successfully verified, a pseudonym token of a subset of unused pseudonym tokens of a set of pseudonym tokens and to issue the selected pseudonym token to the user entity, wherein the pseudonym token is selected and issued according to an Oblivious Transfer protocol so that any association between the identity of the user and the selected pseudonym token is unknown to the registration location, and
receiving, from a log-on location, a used pseudonym token, reducing the subset of unused pseudonym tokens by the used pseudonym token in response to receiving the used pseudonym token, and, during a next verification, selection, and issuance of a further pseudonym token with respect to another user and according to the Oblivious transfer protocol, selecting the further pseudonym token from the reduced subset of unused pseudonym tokens of the set of pseudonym tokens so that any association between an identity of the another user and the selected further pseudonym token is unknown to the registration location, wherein
a computer is programmed to implement the registration location.

16. Authentication method for a log-on location, comprising:
generating a set of pseudonym tokens suitable for an Oblivious Transfer protocol and passing them on to a registration location, or requesting the plurality of pseudonym tokens from the registration location and receiving the set of pseudonym tokens from the registration location,
verifying, within an authentication process of a user entity based on a pseudonym token, whether the pseudonym token belongs to a subset of unused pseudonym tokens of the set of pseudonym tokens,
not completing the authentication process if the result of the verification is that the pseudonym token does not belong to the subset of unused pseudonym tokens, and
completing the authentication process and marking the pseudonym token as used if the result of the verification is that the pseudonym token belongs to the subset of unused pseudonym tokens, so that the subset of unused pseudonym tokens from the plurality of pseudonym tokens is reduced by the pseudonym token, and
agreeing with the user entity on access data for future log-on processes in order to complete the authentication process, wherein
at least one computer or a computer network is programmed to implement the log-on location.

17. A non-transitory computer readable medium including a computer program comprising a program code for performing, when the program runs on a computer, the method for pseudonymized authentication of user entities, the method comprising:

verifying, in a registration location, a proof of identity of a user entity, selecting, in the registration location, a pseudonym token out of a subset of unused pseudonym tokens of a set of pseudonym tokens and issuing the selected pseudonym token to the user entity, performing, in a log-on location and with the user entity, an authentication process of the user entity based on the pseudonym token, marking, in the log-on location and in response to the authentication process of the user entity with the pseudonym token, the pseudonym token as used, so that the subset of unused pseudonym tokens is reduced by the pseudonym token, agreeing, in the log-on location and with the user entity, on access data for future log-on processes in order to complete the authentication process, and verifying, by the authentication process of the user entity based on the pseudonym token, whether the pseudonym token belongs to the subset of unused pseudonym tokens of the set of pseudonym tokens, wherein the pseudonym token is selected and issued according to an Oblivious Transfer protocol so that any association between the identity of the user and the selected pseudonym token is unknown to the registration location, if the result of the step of verifying is that the pseudonym token does not belong to the subset of unused pseudonym tokens, the authentication process is not completed, if the result of the step of verifying is that the pseudonym token belongs to the subset of unused pseudonym tokens, the authentication process is completed and the pseudonym token is marked as used, during a next verification, selection, and issuance in the registration location of a further pseudonym token with respect to another user according to the Oblivious Transfer protocol, the further pseudonym token is selected from the reduced subset of unused pseudonym tokens of the set of pseudonym tokens so that any association between an identity of the another user and the selected further pseudonym token is unknown to the registration location.

18. A non-transitory computer readable medium including a computer program comprising a program code for performing, when the program runs on a computer, the method for selecting a pseudonym token for a user entity, the method comprising verifying a proof of identity of the user entity, selecting, if the proof of identity of the user entity is successfully verified, a pseudonym token of a subset of unused pseudonym tokens of a set of pseudonym tokens and to issue the selected pseudonym token to the user entity, wherein the pseudonym token is selected and issued according to an Oblivious Transfer protocol so that any association between the identity of the user and the selected pseudonym token is unknown to the registration location, and receiving, from a log-on location, a used pseudonym token, reducing the subset of unused pseudonym tokens by the used pseudonym token in response to receiving the used pseudonym token, and, during a next verification, selection, and issuance of a further pseudonym token with respect to another user and according to the Oblivious transfer protocol, selecting the further pseudonym token from the reduced subset of unused pseudonym tokens of the set of pseudonym tokens so that any association between an identity of the another user and the selected further pseudonym token is unknown to the registration location.

19. A non-transitory computer readable medium including a computer program comprising a program code for performing, when the program runs on a computer, the authentication method, the method comprising generating a set of pseudonym tokens suitable for an Oblivious Transfer protocol and passing them on to a registration location or requesting the plurality of pseudonym tokens from the registration location and receiving the set of pseudonym tokens from the registration location, verifying, within an authentication process of a user entity based on a pseudonym token, whether the pseudonym token belongs to a subset of unused pseudonym tokens of the set of pseudonym tokens, not completing the authentication process if the result of the verification is that the pseudonym token does not belong to the subset of unused pseudonym tokens, and completing the authentication process and marking the pseudonym token as used if the result of the verification is that the pseudonym token belongs to the subset of unused pseudonym tokens, so that the subset of unused pseudonym tokens from the plurality of pseudonym tokens is reduced by the pseudonym token, and agreeing with the user entity on access data for future log-on processes in order to complete the authentication process.

* * * * *